US006800238B1

(12) United States Patent
Miller

(10) Patent No.: US 6,800,238 B1
(45) Date of Patent: Oct. 5, 2004

(54) METHOD FOR DOMAIN PATTERNING IN LOW COERCIVE FIELD FERROELECTRICS

(75) Inventor: Gregory D. Miller, Foster City, CA (US)

(73) Assignee: Silicon Light Machines, Inc., Sunnyvale, CA (US)

( * ) Notice: Subject to any disclaimer, the term of this patent is extended or adjusted under 35 U.S.C. 154(b) by 153 days.

(21) Appl. No.: 10/047,550

(22) Filed: Jan. 15, 2002

(51) Int. Cl.[7] .................................................. H05B 6/00
(52) U.S. Cl. ...................................... 264/430; 264/435
(58) Field of Search ................................. 264/430, 435

(56) References Cited

U.S. PATENT DOCUMENTS

| | | | |
|---|---|---|---|
| 1,525,550 A | 2/1925 | Jenkins | |
| 1,548,262 A | 8/1925 | Freedman | |
| RE16,767 E | 10/1927 | Jenkins | |
| 1,814,701 A | 7/1931 | Ives | |
| 2,415,226 A | 2/1947 | Sziklai | 178/5.4 |
| 2,783,406 A | 2/1957 | Vanderhooft | 313/70 |
| 2,920,529 A | 1/1960 | Blythe | 88/73 |
| 2,991,690 A | 7/1961 | Grey et al. | 88/16.6 |
| RE25,169 E | 5/1962 | Glenn | |
| 3,256,465 A | 6/1966 | Weissenstern et al. | 317/101 |
| 3,388,301 A | 6/1968 | James | 317/234 |
| 3,443,871 A | 5/1969 | Chitayat | 356/106 |
| 3,553,364 A | 1/1971 | Lee | 178/7.3 |
| 3,576,394 A | 4/1971 | Lee | 178/7.3 |
| 3,600,798 A | 8/1971 | Lee | 29/592 |
| 3,656,837 A | 4/1972 | Sandbank | 350/161 |
| 3,657,610 A | 4/1972 | Yamamoto et al. | 317/243 |
| 3,693,239 A | 9/1972 | Dix | 29/470 |
| 3,743,507 A | 7/1973 | Ih et al. | 96/81 |
| 3,752,563 A | 8/1973 | Torok et al. | 350/151 |
| 3,781,465 A | 12/1973 | Ernstoff et al. | 178/5.4 BD |
| 3,783,184 A | 1/1974 | Ernstoff et al. | 178/5.4 BD |
| 3,792,916 A | 2/1974 | Sarna | 350/163 |
| 3,802,769 A | 4/1974 | Rotz et al. | 352/43 |
| 3,811,186 A | 5/1974 | Larnerd et al. | 29/626 |
| 3,861,784 A | 1/1975 | Torok | 350/162 R |
| 3,862,360 A | 1/1975 | Dill et al. | 178/7.3 D |
| 3,871,014 A | 3/1975 | King et al. | 357/67 |
| 3,886,310 A | 5/1975 | Guldberg et al. | 178/7.5 D |
| 3,896,338 A | 7/1975 | Nathanson et al. | 315/373 |
| 3,915,548 A | 10/1975 | Opittek | 350/3.5 |
| 3,935,499 A | 1/1976 | Oess | 313/413 |

(List continued on next page.)

FOREIGN PATENT DOCUMENTS

| | | | | |
|---|---|---|---|---|
| DE | 32 33 195 A1 | 3/1983 | | H01L/23/52 |
| DE | 43 23 799 A1 | 1/1994 | | H01L/23/50 |
| DE | 197 23 618 A1 | 12/1997 | | G03F/1/14 |

(List continued on next page.)

OTHER PUBLICATIONS

R. Apte, "Grating Light Valves for High Resolution Displays", Solid State Sensors and Actuators Workshop, Ph D. Dissertation, Stanford University (Jun. 1994).

(List continued on next page.)

*Primary Examiner*—Christopher A. Fiorilla
(74) *Attorney, Agent, or Firm*—Okamoto & Benedicto LLP

(57) ABSTRACT

A method for domain patterning of nonlinear ferroelectric materials. The method seeks to reduce the formation of random and spontaneous micro-domains that typically result during thermal cycling of ferroelectric materials and which leads to patterning defects and degraded performance. In accordance with the invention, a ferroelectric wafer is provided with a conductive layer on the top and bottom surfaces of the wafer. A sufficient bias voltage is applied across the conductive layers to polarize the wafer into a single direction. At least one of the conductive layers is selectively patterned to form a conductive domain template. A sufficient revise bias voltage is then applied to the conductive domain template and a remaining conductive layer to produce the domain patterned structure. According to a preferred embodiment of the invention, the ferroelectric wafer is formed of $LiNbO_3$ or $LiTaO_3$.

22 Claims, 5 Drawing Sheets

U.S. PATENT DOCUMENTS

| | | | |
|---|---|---|---|
| 3,935,500 A | 1/1976 | Oess et al. ................... 313/495 |
| 3,938,881 A | 2/1976 | Biegelsen et al. ........... 350/161 |
| 3,941,456 A | 3/1976 | Schilz et al. ................. 350/161 |
| 3,942,245 A | 3/1976 | Jackson et al. ................ 29/591 |
| 3,943,281 A | 3/1976 | Keller et al. .............. 178/7.5 D |
| 3,947,105 A | 3/1976 | Smith ......................... 353/121 |
| 3,969,611 A | 7/1976 | Fonteneau ................... 219/502 |
| 3,980,476 A | 9/1976 | Wysocki ....................... 96/1.1 |
| 3,991,416 A | 11/1976 | Byles et al. ............. 340/324 R |
| 4,001,663 A | 1/1977 | Bray ............................. 321/2 |
| 4,004,849 A | 1/1977 | Shattuck .................. 350/160 R |
| 4,006,968 A | 2/1977 | Ernstoff et al. ........ 350/160 LC |
| 4,009,939 A | 3/1977 | Okano ................... 350/162 SF |
| 4,011,009 A | 3/1977 | Lama et al. ............. 350/162 R |
| 4,012,116 A | 3/1977 | Yevick ........................ 350/132 |
| 4,012,835 A | 3/1977 | Wallick ........................ 29/591 |
| 4,017,158 A | 4/1977 | Booth .................. 350/162 SF |
| 4,020,381 A | 4/1977 | Oess et al. ................... 313/302 |
| 4,021,766 A | 5/1977 | Aine ............................. 338/2 |
| 4,034,211 A | 7/1977 | Horst et al. .......... 235/61.12 N |
| 4,034,399 A | 7/1977 | Drukier et al. ................ 357/68 |
| 4,035,068 A | 7/1977 | Rawson ....................... 353/122 |
| 4,067,129 A | 1/1978 | Abramson et al. ........... 40/563 |
| 4,084,437 A | 4/1978 | Finnegan ..................... 73/361 |
| 4,090,219 A | 5/1978 | Ernstoff et al. ............... 358/59 |
| 4,093,346 A | 6/1978 | Nishino et al. ........ 350/162 SF |
| 4,093,921 A | 6/1978 | Buss .......................... 325/459 |
| 4,093,922 A | 6/1978 | Buss .......................... 325/459 |
| 4,100,579 A | 7/1978 | Ernstoff ...................... 358/230 |
| 4,103,273 A | 7/1978 | Keller ........................... 338/2 |
| 4,126,380 A | 11/1978 | Borm ......................... 350/266 |
| 4,127,322 A | 11/1978 | Jacobson et al. ............. 353/31 |
| 4,135,502 A | 1/1979 | Peck ......................... 128/76.5 |
| 4,139,257 A | 2/1979 | Matsumoto ................ 350/6.1 |
| 4,143,943 A | 3/1979 | Rawson ....................... 350/120 |
| 4,163,570 A | 8/1979 | Greenaway ................ 283/8 A |
| 4,184,700 A | 1/1980 | Greenaway ..................... 283/6 |
| 4,185,891 A | 1/1980 | Kaestner ..................... 350/167 |
| 4,190,855 A | 2/1980 | Inoue ........................... 357/80 |
| 4,195,915 A | 4/1980 | Lichty et al. ................ 350/345 |
| 4,205,428 A | 6/1980 | Ernstoff et al. ........... 29/592 R |
| 4,211,918 A | 7/1980 | Nyfeler et al. .............. 235/454 |
| 4,223,050 A | 9/1980 | Nyfeler et al. .............. 427/163 |
| 4,225,913 A | 9/1980 | Bray ........................... 363/97 |
| 4,249,796 A | 2/1981 | Sincerbox et al. .......... 350/370 |
| 4,250,217 A | 2/1981 | Greenaway ................. 428/161 |
| 4,250,393 A | 2/1981 | Greenaway ................. 250/566 |
| 4,256,787 A | 3/1981 | Shaver et al. ................. 428/1 |
| 4,257,016 A | 3/1981 | Kramer, Jr. et al. ....... 322/7.51 |
| 4,290,672 A | 9/1981 | Whitefield .................. 350/358 |
| 4,295,145 A | 10/1981 | Latta .......................... 346/108 |
| 4,311,999 A | 1/1982 | Upton et al. ................ 340/755 |
| 4,327,411 A | 4/1982 | Turner ....................... 364/900 |
| 4,327,966 A | 5/1982 | Bloom .................. 350/162 R |
| 4,331,972 A | 5/1982 | Rajchman .................... 358/60 |
| 4,336,982 A | 6/1982 | Rector, Jr. .................. 350/358 |
| 4,338,660 A | 7/1982 | Kelley et al. ............... 364/200 |
| 4,343,535 A | 8/1982 | Bleha, Jr. ................... 350/342 |
| 4,346,965 A | 8/1982 | Sprague et al. ............. 350/358 |
| 4,348,079 A | 9/1982 | Johnson ..................... 350/358 |
| 4,355,463 A | 10/1982 | Burns ......................... 29/827 |
| 4,361,384 A | 11/1982 | Bosserman ................. 350/174 |
| 4,369,524 A | 1/1983 | Rawson et al. ............. 455/606 |
| 4,374,397 A | 2/1983 | Mir ............................. 358/75 |
| 4,389,096 A | 6/1983 | Hori et al. .............. 350/339 R |
| 4,391,490 A | 7/1983 | Hartke ........................ 350/356 |
| 4,396,246 A | 8/1983 | Holman ................... 350/96.14 |
| 4,398,798 A | 8/1983 | Krawczak et al. ...... 350/162.24 |
| 4,400,740 A | 8/1983 | Traino et al. ............... 358/293 |
| 4,408,884 A | 10/1983 | Kleinknecht et al. ....... 356/355 |
| 4,414,583 A | 11/1983 | Hooker, III ................. 358/300 |
| 4,417,386 A | 11/1983 | Exner ........................... 29/590 |
| 4,418,397 A | 11/1983 | Brantingham et al. ...... 364/900 |
| 4,420,717 A | 12/1983 | Wallace et al. ............. 318/696 |
| 4,422,099 A | 12/1983 | Wolfe ......................... 358/293 |
| 4,426,768 A | 1/1984 | Black et al. ................... 29/583 |
| 4,430,584 A | 2/1984 | Someshwar et al. ........ 307/465 |
| 4,435,041 A | 3/1984 | Torok et al. ........... 350/162.24 |
| 4,440,839 A | 4/1984 | Mottier .......................... 430/2 |
| 4,443,819 A | 4/1984 | Funada et al. .............. 358/236 |
| 4,443,845 A | 4/1984 | Hamilton et al. ........... 364/200 |
| 4,447,881 A | 5/1984 | Brantingham et al. ...... 364/488 |
| 4,454,591 A | 6/1984 | Lou .......................... 364/900 |
| 4,456,338 A | 6/1984 | Gelbart ...................... 350/358 |
| 4,460,907 A | 7/1984 | Nelson .................... 346/153.1 |
| 4,462,046 A | 7/1984 | Spight ........................ 358/101 |
| 4,467,342 A | 8/1984 | Tower ........................... 357/30 |
| 4,468,725 A | 8/1984 | Venturini .................... 363/160 |
| 4,483,596 A | 11/1984 | Marshall .................... 350/385 |
| 4,484,188 A | 11/1984 | Ott .............................. 340/728 |
| 4,487,677 A | 12/1984 | Murphy ...................... 204/247 |
| 4,492,435 A | 1/1985 | Banton et al. .............. 350/360 |
| 4,503,494 A | 3/1985 | Hamilton et al. ........... 364/200 |
| 4,511,220 A | 4/1985 | Scully ........................ 350/403 |
| 4,538,883 A | 9/1985 | Sprague et al. ............. 350/356 |
| 4,545,610 A | 10/1985 | Lakritz et al. ................ 29/589 |
| 4,556,378 A | 12/1985 | Nyfeler et al. .............. 425/143 |
| 4,558,171 A | 12/1985 | Gantley et al. .......... 174/52 FP |
| 4,561,011 A | 12/1985 | Kohara et al. |
| 4,561,044 A | 12/1985 | Ogura et al. .................. 362/84 |
| 4,566,935 A | 1/1986 | Hornbeck ................... 156/626 |
| 4,567,585 A | 1/1986 | Gelbart ......................... 369/97 |
| 4,571,041 A | 2/1986 | Gaudyn ........................ 353/10 |
| 4,571,603 A | 2/1986 | Hornbeck et al. ........... 346/160 |
| 4,577,932 A | 3/1986 | Gelbart ...................... 350/358 |
| 4,577,933 A | 3/1986 | Yip et al. .................... 350/358 |
| 4,588,957 A | 5/1986 | Balant et al. ................. 330/4.3 |
| 4,590,548 A | 5/1986 | Maytum ..................... 363/161 |
| 4,594,501 A | 6/1986 | Culley et al. ............... 219/492 |
| 4,596,992 A | 6/1986 | Hornbeck ............... 346/76 PH |
| 4,615,595 A | 10/1986 | Hornbeck ................... 353/122 |
| 4,623,219 A | 11/1986 | Trias .......................... 350/351 |
| 4,636,039 A | 1/1987 | Turner ........................ 350/356 |
| 4,636,866 A | 1/1987 | Hattori ....................... 358/236 |
| 4,641,193 A | 2/1987 | Glenn ......................... 358/233 |
| 4,645,881 A | 2/1987 | LeToumelin et al. ........ 379/252 |
| 4,646,158 A | 2/1987 | Ohno et al. ................. 358/236 |
| 4,649,085 A | 3/1987 | Landram .................... 428/620 |
| 4,649,432 A | 3/1987 | Watanabe ................... 358/241 |
| 4,652,932 A | 3/1987 | Miyajima et al. ........... 358/236 |
| 4,655,539 A | 4/1987 | Caulfield et al. ............. 350/3.6 |
| 4,660,938 A | 4/1987 | Kazan ........................ 350/355 |
| 4,661,828 A | 4/1987 | Miller, Jr. et al. .......... 346/108 |
| 4,662,746 A | 5/1987 | Hornbeck ................... 350/269 |
| 4,663,670 A | 5/1987 | Ito et al. ..................... 358/245 |
| 4,687,326 A | 8/1987 | Corby, Jr. ...................... 356/5 |
| 4,698,602 A | 10/1987 | Armitage ................... 332/7.51 |
| 4,700,276 A | 10/1987 | Freyman et al. ............ 361/403 |
| 4,707,064 A | 11/1987 | Dobrowolski et al. ... 350/96.19 |
| 4,709,995 A | 12/1987 | Kuribayashi et al. ....... 350/350 |
| 4,710,732 A | 12/1987 | Hornbeck .................. 332/7.51 |
| 4,711,526 A | 12/1987 | Hennings et al. ........... 350/170 |
| 4,714,326 A | 12/1987 | Usui et al. .................. 350/485 |
| 4,717,066 A | 1/1988 | Goldenberg et al. ........ 228/179 |
| 4,719,507 A | 1/1988 | Bos ............................. 358/92 |
| 4,721,629 A | 1/1988 | Sakai et al. ................... 427/35 |
| 4,722,593 A | 2/1988 | Shimazaki .................. 350/336 |
| 4,724,467 A | 2/1988 | Yip et al. ...................... 355/71 |
| 4,728,185 A | 3/1988 | Thomas ...................... 353/122 |
| 4,743,091 A | 5/1988 | Gelbart ....................... 350/252 |
| 4,744,633 A | 5/1988 | Sheiman .................... 350/132 |

| | | | |
|---|---|---|---|
| 4,747,671 A | 5/1988 | Takahashi et al. ........... 350/336 |
| 4,751,509 A | 6/1988 | Kubota et al. ............... 340/784 |
| 4,761,253 A | 8/1988 | Antes ......................... 264/1.3 |
| 4,763,975 A | 8/1988 | Scifres et al. ............. 350/96.15 |
| 4,765,865 A | 8/1988 | Gealer et al. ............... 156/647 |
| 4,772,094 A | 9/1988 | Sheiman ...................... 350/133 |
| 4,797,694 A | 1/1989 | Agostinelli et al. .......... 346/160 |
| 4,797,918 A | 1/1989 | Lee et al. ...................... 380/20 |
| 4,801,194 A | 1/1989 | Agostinelli et al. .......... 350/356 |
| 4,803,560 A | 2/1989 | Matsunaga et al. .......... 359/236 |
| 4,804,641 A | 2/1989 | Arlt et al. .................... 437/227 |
| 4,807,021 A | 2/1989 | Okumura ..................... 357/75 |
| 4,807,965 A | 2/1989 | Garakani .................... 350/131 |
| 4,809,078 A | 2/1989 | Yabe et al. .................. 358/236 |
| 4,811,082 A | 3/1989 | Jacobs et al. ................. 357/80 |
| 4,811,210 A | 3/1989 | McAulay .................... 364/200 |
| 4,814,759 A | 3/1989 | Gombrich et al. .......... 340/771 |
| 4,817,850 A | 4/1989 | Wiener-Avnear et al. ... 228/119 |
| 4,824,200 A | 4/1989 | Isono et al. ............... 350/96.16 |
| 4,827,391 A | 5/1989 | Sills ............................ 363/41 |
| 4,829,365 A | 5/1989 | Eichenlaub .................... 358/3 |
| 4,836,649 A | 6/1989 | Ledebuhr et al. ........ 350/331 R |
| 4,856,863 A | 8/1989 | Sampsell et al. ......... 350/96.16 |
| 4,856,869 A | 8/1989 | Sakata et al. ........... 350/162.18 |
| 4,859,012 A | 8/1989 | Cohn ....................... 350/96.24 |
| 4,859,060 A | 8/1989 | Katagiri et al. ............. 356/352 |
| 4,866,488 A | 9/1989 | Frensley ........................ 357/4 |
| 4,882,683 A | 11/1989 | Rupp et al. ................. 364/521 |
| 4,893,509 A | 1/1990 | MacIver et al. ........ 73/517 AV |
| 4,896,325 A | 1/1990 | Coldren ....................... 372/20 |
| 4,896,948 A | 1/1990 | Dono et al. ................. 350/355 |
| 4,897,708 A | 1/1990 | Clements ...................... 357/65 |
| 4,902,083 A | 2/1990 | Wells ......................... 350/6.6 |
| 4,915,463 A | 4/1990 | Barbee, Jr. ................... 350/1.1 |
| 4,915,479 A | 4/1990 | Clarke ........................ 350/345 |
| 4,924,413 A | 5/1990 | Suwannukul ............... 364/521 |
| 4,926,241 A | 5/1990 | Carey ........................... 357/75 |
| 4,930,043 A | 5/1990 | Wiegand .................... 361/283 |
| 4,934,773 A | 6/1990 | Becker ........................ 350/6.6 |
| 4,940,309 A | 7/1990 | Baum ......................... 350/171 |
| 4,943,815 A | 7/1990 | Aldrich et al. .............. 346/108 |
| 4,945,773 A | 8/1990 | Sickafus .................. 73/862.59 |
| 4,949,148 A | 8/1990 | Bartelink ..................... 357/74 |
| 4,950,890 A | 8/1990 | Gelbart .................. 250/237 G |
| 4,952,925 A | 8/1990 | Haastert ..................... 340/784 |
| 4,954,789 A | 9/1990 | Sampsell .................... 330/4.3 |
| 4,956,619 A | 9/1990 | Hornbeck ................... 330/4.3 |
| 4,961,633 A | 10/1990 | Ibrahim et al. ............. 350/392 |
| 4,970,575 A | 11/1990 | Soga et al. ................... 357/72 |
| 4,978,202 A | 12/1990 | Yang ...................... 350/331 R |
| 4,982,184 A | 1/1991 | Kirkwood .................. 340/783 |
| 4,982,265 A | 1/1991 | Watanabe et al. ............ 357/75 |
| 4,984,824 A | 1/1991 | Antes et al. .................. 283/91 |
| 4,999,308 A | 3/1991 | Nishiura et al. ............... 437/4 |
| 5,003,300 A | 3/1991 | Wells ......................... 340/705 |
| 5,009,473 A | 4/1991 | Hunter et al. ................ 350/6.6 |
| 5,013,141 A | 5/1991 | Sakata ........................ 350/348 |
| 5,018,256 A | 5/1991 | Hornbeck .................. 29/25.01 |
| 5,022,750 A | 6/1991 | Flasck ......................... 353/31 |
| 5,023,905 A | 6/1991 | Wells et al. .................. 379/96 |
| 5,024,494 A | 6/1991 | Williams et al. ............. 350/3.6 |
| 5,028,939 A | 7/1991 | Hornbeck et al. .......... 346/160 |
| 5,031,144 A * | 7/1991 | Persky ....................... 365/145 |
| 5,035,473 A | 7/1991 | Kuwayama et al. ......... 350/3.7 |
| 5,037,173 A | 8/1991 | Sampsell et al. ............. 385/17 |
| 5,039,628 A | 8/1991 | Carey ........................ 437/183 |
| 5,040,052 A | 8/1991 | McDavid .................... 357/80 |
| 5,041,395 A | 8/1991 | Steffen ...................... 437/206 |
| 5,041,851 A | 8/1991 | Nelson ...................... 346/160 |
| 5,043,917 A | 8/1991 | Okamoto ................... 364/518 |
| 5,048,077 A | 9/1991 | Wells et al. .................. 379/96 |
| 5,049,901 A | 9/1991 | Gelbart ...................... 346/108 |
| 5,058,992 A | 10/1991 | Takahashi .................. 359/567 |
| 5,060,058 A | 10/1991 | Goldenberg et al. .......... 358/60 |
| 5,061,049 A | 10/1991 | Hornbeck ................... 359/224 |
| 5,066,614 A | 11/1991 | Dunnaway et al. ......... 437/209 |
| 5,068,205 A | 11/1991 | Baxter et al. ............... 437/205 |
| 5,072,239 A | 12/1991 | Mitcham et al. ............ 346/108 |
| 5,072,418 A | 12/1991 | Boutaud et al. ........ 364/715.06 |
| 5,074,947 A | 12/1991 | Estes et al. ............... 156/307.3 |
| 5,075,940 A | 12/1991 | Kuriyama et al. ......... 29/25.03 |
| 5,079,544 A | 1/1992 | DeMond et al. ............ 340/701 |
| 5,081,617 A | 1/1992 | Gelbart ...................... 369/112 |
| 5,083,857 A | 1/1992 | Hornbeck ................... 359/291 |
| 5,085,497 A | 2/1992 | Um et al. ................... 359/848 |
| 5,089,903 A | 2/1992 | Kuwayama et al. .......... 359/15 |
| 5,093,281 A | 3/1992 | Eshima ...................... 437/217 |
| 5,096,279 A | 3/1992 | Hornbeck et al. .......... 359/230 |
| 5,099,353 A | 3/1992 | Hornbeck ................... 359/291 |
| 5,101,184 A | 3/1992 | Antes ......................... 235/454 |
| 5,101,236 A | 3/1992 | Nelson et al. .............. 355/229 |
| 5,103,334 A | 4/1992 | Swanberg ................... 359/197 |
| 5,105,207 A | 4/1992 | Nelson ....................... 346/160 |
| 5,105,299 A | 4/1992 | Anderson et al. ........... 359/223 |
| 5,105,369 A | 4/1992 | Nelson ....................... 364/525 |
| 5,107,372 A | 4/1992 | Gelbart et al. .............. 359/824 |
| 5,112,436 A | 5/1992 | Bol ............................ 156/643 |
| 5,113,272 A | 5/1992 | Reamey ....................... 359/53 |
| 5,113,285 A | 5/1992 | Franklin et al. ............. 359/465 |
| 5,115,344 A | 5/1992 | Jaskie ........................ 359/573 |
| 5,119,204 A | 6/1992 | Hashimoto et al. ......... 358/254 |
| 5,121,343 A | 6/1992 | Faris ......................... 395/111 |
| 5,126,812 A | 6/1992 | Greiff ......................... 357/25 |
| 5,126,826 A | 6/1992 | Kauchi et al. ................ 357/72 |
| 5,126,836 A | 6/1992 | Um ............................ 358/60 |
| 5,128,660 A | 7/1992 | DeMond et al. ............ 340/707 |
| 5,129,716 A | 7/1992 | Holakovszky et al. ........ 351/50 |
| 5,132,723 A | 7/1992 | Gelbart ........................ 355/40 |
| 5,132,812 A | 7/1992 | Takahashi et al. ............ 359/9 |
| 5,136,695 A | 8/1992 | Goldshlag et al. .......... 395/275 |
| 5,137,836 A | 8/1992 | Lam ............................ 437/8 |
| 5,142,303 A | 8/1992 | Nelson ....................... 346/108 |
| 5,142,405 A | 8/1992 | Hornbeck ................... 359/226 |
| 5,142,677 A | 8/1992 | Ehlig et al. ................. 395/650 |
| 5,144,472 A | 9/1992 | Sang, Jr. et al. ............ 359/254 |
| 5,147,815 A | 9/1992 | Casto .......................... 437/51 |
| 5,148,157 A | 9/1992 | Florence .................... 340/783 |
| 5,148,506 A | 9/1992 | McDonald ................... 385/16 |
| 5,149,405 A | 9/1992 | Bruns et al. .............. 204/129.1 |
| 5,150,205 A | 9/1992 | Um et al. ..................... 358/60 |
| 5,151,718 A | 9/1992 | Nelson ....................... 346/160 |
| 5,151,724 A | 9/1992 | Kikinis ........................ 357/17 |
| 5,151,763 A | 9/1992 | Marek et al. ................. 357/26 |
| 5,153,770 A | 10/1992 | Harris ........................ 359/245 |
| 5,155,604 A | 10/1992 | Miekka et al. ................ 359/2 |
| 5,155,615 A | 10/1992 | Tagawa ..................... 359/213 |
| 5,155,778 A | 10/1992 | Magel et al. ................. 385/18 |
| 5,155,812 A | 10/1992 | Ehlig et al. ................. 395/275 |
| 5,157,304 A | 10/1992 | Kane et al. ................. 313/495 |
| 5,159,485 A | 10/1992 | Nelson ....................... 359/291 |
| 5,161,042 A | 11/1992 | Hamada ...................... 359/41 |
| 5,162,787 A | 11/1992 | Thompson et al. .......... 340/794 |
| 5,164,019 A | 11/1992 | Sinton ........................ 136/249 |
| 5,165,013 A | 11/1992 | Faris ......................... 395/104 |
| 5,168,401 A | 12/1992 | Endriz ........................ 359/625 |
| 5,168,406 A | 12/1992 | Nelson ....................... 359/855 |
| 5,170,156 A | 12/1992 | DeMond et al. ............ 340/794 |
| 5,170,269 A | 12/1992 | Lin et al. ...................... 359/9 |
| 5,170,283 A | 12/1992 | O'Brien et al. ............. 359/291 |
| 5,172,161 A | 12/1992 | Nelson ....................... 355/200 |
| 5,172,262 A | 12/1992 | Hornbeck ................... 359/223 |
| 5,177,724 A | 1/1993 | Gelbart ................... 369/44.16 |

| | | | | | | | |
|---|---|---|---|---|---|---|---|
| 5,178,728 | A | | 1/1993 | Boysel et al. ............... 156/656 | 5,285,407 A | 2/1994 | Gale et al. ............. 365/189.11 |
| 5,179,274 | A | | 1/1993 | Sampsell ................ 250/208.2 | 5,287,096 A | 2/1994 | Thompson et al. .......... 345/147 |
| 5,179,367 | A | | 1/1993 | Shimizu .................... 340/700 | 5,287,215 A | 2/1994 | Warde et al. ................ 359/293 |
| 5,181,231 | A | | 1/1993 | Parikh et al. ................. 377/26 | 5,289,172 A | 2/1994 | Gale, Jr. et al. ............. 345/108 |
| 5,182,665 | A | | 1/1993 | O'Callaghan et al. ........ 359/95 | 5,291,317 A | 3/1994 | Newswanger ................. 359/15 |
| 5,185,660 | A | | 2/1993 | Um ............................. 358/60 | 5,291,473 A | 3/1994 | Pauli ......................... 369/112 |
| 5,185,823 | A | * | 2/1993 | Kaku et al. ..................... 385/2 | 5,293,511 A | 3/1994 | Poradish et al. ............. 257/434 |
| 5,188,280 | A | | 2/1993 | Nakao et al. .................. 228/123 | 5,296,408 A | 3/1994 | Wilbarg et al. ............. 437/203 |
| 5,189,404 | A | | 2/1993 | Masimo et al. ............. 340/720 | 5,296,891 A | 3/1994 | Vogt et al. ..................... 355/67 |
| 5,189,505 | A | | 2/1993 | Bartelink .................... 257/419 | 5,296,950 A | 3/1994 | Lin et al. ......................... 359/9 |
| 5,191,405 | A | | 3/1993 | Tomita et al. .............. 257/777 | 5,298,460 A | 3/1994 | Nishiguchi et al. .......... 437/183 |
| 5,192,864 | A | | 3/1993 | McEwen et al. ............ 250/234 | 5,299,037 A | 3/1994 | Sakata ......................... 359/41 |
| 5,192,946 | A | | 3/1993 | Thompson et al. ......... 340/794 | 5,299,289 A | 3/1994 | Omae et al. ................... 359/95 |
| 5,198,895 | A | | 3/1993 | Vick .......................... 358/103 | 5,300,813 A | 4/1994 | Joshi et al. ................. 257/752 |
| D334,557 | S | | 4/1993 | Hunter et al. .............. D14/114 | 5,301,062 A | 4/1994 | Takahashi et al. .......... 359/567 |
| D334,742 | S | | 4/1993 | Hunter et al. .............. D14/113 | 5,303,043 A | 4/1994 | Glenn ......................... 348/40 |
| 5,202,785 | A | | 4/1993 | Nelson ...................... 359/214 | 5,303,055 A | 4/1994 | Hendrix et al. ............. 348/761 |
| 5,206,629 | A | | 4/1993 | DeMond et al. ............ 340/719 | 5,307,056 A | 4/1994 | Urbanus ..................... 340/189 |
| 5,206,829 | A | * | 4/1993 | Thakoor et al. ............ 365/117 | 5,307,185 A | 4/1994 | Jones et al. ................... 359/41 |
| 5,208,818 | A | | 5/1993 | Gelbart et al. ................. 372/30 | 5,310,624 A | 5/1994 | Ehrlich ......................... 430/322 |
| 5,208,891 | A | | 5/1993 | Prysner ...................... 385/116 | 5,311,349 A | 5/1994 | Anderson et al. ............ 359/223 |
| 5,210,637 | A | | 5/1993 | Puzey ........................ 359/263 | 5,311,360 A | 5/1994 | Bloom et al. ................ 359/572 |
| 5,212,115 | A | | 5/1993 | Cho et al. .................... 437/208 | 5,312,513 A | 5/1994 | Florence et al. ............. 156/643 |
| 5,212,555 | A | | 5/1993 | Stoltz ........................ 358/206 | 5,313,479 A | 5/1994 | Florence ....................... 372/26 |
| 5,212,582 | A | | 5/1993 | Nelson ...................... 359/224 | 5,313,648 A | 5/1994 | Ehlig et al. ................. 395/800 |
| 5,214,308 | A | | 5/1993 | Nishiguchi et al. ......... 257/692 | 5,313,835 A | 5/1994 | Dunn ........................... 73/505 |
| 5,214,419 | A | | 5/1993 | DeMond et al. ............ 340/794 | 5,315,418 A | 5/1994 | Sprague et al. ................. 359/41 |
| 5,214,420 | A | | 5/1993 | Thompson et al. ......... 340/795 | 5,315,423 A | 5/1994 | Hong ......................... 359/124 |
| 5,216,278 | A | | 6/1993 | Lin et al. | 5,319,214 A | 6/1994 | Gregory et al. .......... 250/504 R |
| 5,216,537 | A | | 6/1993 | Hornbeck ................... 359/291 | 5,319,668 A | 6/1994 | Luecke ....................... 372/107 |
| 5,216,544 | A | | 6/1993 | Horikawa et al. .......... 359/622 | 5,319,789 A | 6/1994 | Ehlig et al. ................. 395/800 |
| 5,219,794 | A | | 6/1993 | Satoh et al. ................. 437/209 | 5,319,792 A | 6/1994 | Ehlig et al. ................. 395/800 |
| 5,220,200 | A | | 6/1993 | Blanton ...................... 257/778 | 5,320,709 A | 6/1994 | Bowden et al. |
| 5,221,400 | A | | 6/1993 | Staller et al. ............... 156/292 | 5,321,416 A | 6/1994 | Bassett et al. ................. 345/8 |
| 5,221,982 | A | | 6/1993 | Faris .......................... 359/93 | 5,323,002 A | 6/1994 | Sampsell et al. ......... 250/252.1 |
| 5,224,088 | A | | 6/1993 | Atiya .......................... 369/97 | 5,323,051 A | 6/1994 | Adams et al. ............... 257/417 |
| D337,320 | S | | 7/1993 | Hunter et al. .............. D14/113 | 5,325,116 A | 6/1994 | Sampsell ..................... 346/108 |
| 5,226,099 | A | | 7/1993 | Mignardi et al. ............. 385/19 | 5,327,286 A | 7/1994 | Sampsell et al. ........... 359/561 |
| 5,230,005 | A | | 7/1993 | Rubino et al. ................ 372/20 | 5,329,289 A | 7/1994 | Sakamoto et al. ........... 345/126 |
| 5,231,363 | A | | 7/1993 | Sano et al. ................. 332/109 | 5,330,301 A | 7/1994 | Brancher .................... 414/417 |
| 5,231,388 | A | | 7/1993 | Stoltz ........................ 340/783 | 5,330,878 A | 7/1994 | Nelson ........................ 430/311 |
| 5,231,432 | A | | 7/1993 | Glenn ......................... 353/31 | 5,331,454 A | 7/1994 | Hornbeck ................... 359/224 |
| 5,233,456 | A | | 8/1993 | Nelson ...................... 359/214 | 5,334,991 A | 8/1994 | Wells et al. ..................... 345/8 |
| 5,233,460 | A | | 8/1993 | Partlo et al. ................. 359/247 | 5,339,116 A | 8/1994 | Urbanus et al. ............. 348/716 |
| 5,233,874 | A | | 8/1993 | Putty et al. ............. 73/517 AV | 5,339,177 A | 8/1994 | Jenkins et al. ................. 359/35 |
| 5,237,340 | A | | 8/1993 | Nelson ...................... 346/108 | 5,340,772 A | 8/1994 | Rosotker ..................... 437/226 |
| 5,237,435 | A | | 8/1993 | Kurematsu et al. ........... 359/41 | 5,345,521 A | 9/1994 | McDonald et al. ........... 385/19 |
| 5,239,448 | A | | 8/1993 | Perkins et al. .............. 361/764 | 5,347,321 A | 9/1994 | Gove ......................... 348/663 |
| 5,239,806 | A | | 8/1993 | Maslakow ................... 53/432 | 5,347,378 A | 9/1994 | Handschy et al. ............. 359/53 |
| 5,240,818 | A | | 8/1993 | Mignardi et al. ........... 430/321 | 5,347,433 A | 9/1994 | Sedlmayr ..................... 362/32 |
| 5,245,686 | A | | 9/1993 | Faris et al. .................. 385/119 | 5,348,619 A | 9/1994 | Bohannon et al. ........... 156/664 |
| 5,247,180 | A | | 9/1993 | Mitcham et al. .......... 250/492.1 | 5,349,687 A | 9/1994 | Ehlig et al. ................. 395/800 |
| 5,247,593 | A | | 9/1993 | Lin et al. ....................... 385/17 | 5,351,052 A | 9/1994 | D'Hont et al. ................. 342/42 |
| 5,249,245 | A | | 9/1993 | Lebby et al. ................. 385/89 | 5,352,926 A | 10/1994 | Andrews .................... 257/717 |
| 5,251,057 | A | | 10/1993 | Guerin et al. ............... 359/249 | 5,354,416 A | 10/1994 | Okudaira .................... 156/643 |
| 5,251,058 | A | | 10/1993 | MacArthur ................. 359/249 | 5,357,369 A | 10/1994 | Pilling et al. ................ 359/462 |
| 5,254,980 | A | | 10/1993 | Hendrix et al. ............... 345/84 | 5,357,803 A | 10/1994 | Lane ........................ 73/517 B |
| 5,255,100 | A | | 10/1993 | Urbanus ..................... 358/231 | 5,359,349 A | 10/1994 | Jambor et al. ............... 345/168 |
| 5,256,869 | A | | 10/1993 | Lin et al. ................. 250/201.9 | 5,359,451 A | 10/1994 | Gelbart et al. .............. 359/285 |
| 5,258,325 | A | | 11/1993 | Spitzer et al. ................. 437/86 | 5,361,131 A | 11/1994 | Tekemori et al. ........... 356/355 |
| 5,260,718 | A | | 11/1993 | Rommelmann et al.   346/107 R | 5,363,220 A | 11/1994 | Kuwayama et al. ............ 359/3 |
| 5,260,798 | A | | 11/1993 | Um et al. .................... 358/233 | 5,365,283 A | 11/1994 | Doherty et al. ............. 348/743 |
| 5,262,000 | A | | 11/1993 | Welbourn et al. ........... 156/643 | 5,367,585 A | 11/1994 | Ghezzo et al. ................ 385/23 |
| 5,272,473 | A | | 12/1993 | Thompson et al. ............. 345/7 | 5,371,543 A | 12/1994 | Anderson .................... 348/270 |
| 5,278,652 | A | | 1/1994 | Urbanus et al. ............. 358/160 | 5,371,618 A | 12/1994 | Tai et al. ....................... 359/53 |
| 5,278,925 | A | | 1/1994 | Boysel et al. ................. 385/14 | 5,382,961 A | 1/1995 | Gale, Jr. ..................... 345/108 |
| 5,280,277 | A | | 1/1994 | Hornbeck ................... 345/108 | 5,387,924 A | 2/1995 | Gale, Jr. et al. ............. 345/108 |
| 5,281,887 | A | | 1/1994 | Engle ........................ 310/335 | 5,389,182 A | 2/1995 | Mignardi .................... 156/344 |
| 5,281,957 | A | | 1/1994 | Schoolman .................. 345/8 | 5,391,881 A | 2/1995 | Jeuch et al. ............. 250/370.09 |
| 5,285,105 | A | | 2/1994 | Cain .......................... 257/672 | 5,392,140 A | 2/1995 | Ezra et al. ..................... 359/41 |
| 5,285,196 | A | | 2/1994 | Gale, Jr. ..................... 345/108 | 5,392,151 A | 2/1995 | Nelson ....................... 359/223 |

| Patent | Date | Inventor | Class |
|---|---|---|---|
| 5,394,303 A | 2/1995 | Yamaji | 361/749 |
| 5,398,071 A | 3/1995 | Gove et al. | 348/558 |
| 5,399,898 A | 3/1995 | Rostoker | 257/499 |
| 5,404,365 A | 4/1995 | Hiiro | 372/27 |
| 5,404,485 A | 4/1995 | Ban | 395/425 |
| 5,408,123 A | 4/1995 | Murai | 257/531 |
| 5,410,315 A | 4/1995 | Huber | 342/42 |
| 5,411,769 A | 5/1995 | Hornbeck | 427/534 |
| 5,412,186 A | 5/1995 | Gale | 219/679 |
| 5,412,501 A | 5/1995 | Fisli | 359/286 |
| 5,418,584 A | 5/1995 | Larson | 353/122 |
| 5,420,655 A | 5/1995 | Shimizu | 353/33 |
| 5,420,722 A | 5/1995 | Bielak | 359/708 |
| 5,426,072 A | 6/1995 | Finnila | 437/208 |
| 5,427,975 A | 6/1995 | Sparks et al. | 437/79 |
| 5,430,524 A | 7/1995 | Nelson | 355/200 |
| 5,435,876 A | 7/1995 | Alfaro et al. | 156/247 |
| 5,438,477 A | 8/1995 | Pasch | 361/689 |
| 5,439,731 A | 8/1995 | Li et al. | 428/209 |
| 5,442,411 A | 8/1995 | Urbanus et al. | 348/771 |
| 5,442,414 A | 8/1995 | Janssen et al. | 353/98 |
| 5,444,566 A | 8/1995 | Gale et al. | 359/291 |
| 5,445,559 A | 8/1995 | Gale et al. | 451/388 |
| 5,446,479 A | 8/1995 | Thompson et al. | 345/139 |
| 5,447,600 A | 9/1995 | Webb | 216/2 |
| 5,448,314 A | 9/1995 | Heimbuch et al. | 348/743 |
| 5,448,546 A | 9/1995 | Pauli | 369/112 |
| 5,450,088 A | 9/1995 | Meier et al. | 342/51 |
| 5,450,219 A | 9/1995 | Gold et al. | 359/40 |
| 5,451,103 A | 9/1995 | Hatanaka et al. | 353/31 |
| 5,452,024 A | 9/1995 | Sampsell | 348/755 |
| 5,452,138 A | 9/1995 | Mignardi et al. | 359/855 |
| 5,453,747 A | 9/1995 | D'Hont et al. | 342/42 |
| 5,453,778 A | 9/1995 | Venkateswar et al. | 347/239 |
| 5,453,803 A | 9/1995 | Shapiro et al. | 353/119 |
| 5,454,160 A | 10/1995 | Nickel | 29/840 |
| 5,454,906 A | 10/1995 | Baker et al. | 216/66 |
| 5,455,445 A | 10/1995 | Kurtz et al. | 257/419 |
| 5,455,455 A | 10/1995 | Badehi | 257/690 |
| 5,455,602 A | 10/1995 | Tew | 347/239 |
| 5,457,493 A | 10/1995 | Leddy et al. | 348/164 |
| 5,457,566 A | 10/1995 | Sampsell et al. | 359/292 |
| 5,457,567 A | 10/1995 | Shinohara | 359/305 |
| 5,458,716 A | 10/1995 | Alfaro et al. | 156/245 |
| 5,459,492 A | 10/1995 | Venkateswar | 347/253 |
| 5,459,528 A | 10/1995 | Pettitt | 348/568 |
| 5,459,592 A | 10/1995 | Shibatani et al. | 359/40 |
| 5,459,610 A | 10/1995 | Bloom et al. | 359/572 |
| 5,461,197 A | 10/1995 | Hiruta et al. | 174/52.4 |
| 5,461,410 A | 10/1995 | Venkateswar et al. | 347/240 |
| 5,461,411 A | 10/1995 | Florence et al. | 347/24 |
| 5,461,547 A | 10/1995 | Ciupke et al. | 362/31 |
| 5,463,347 A | 10/1995 | Jones et al. | 330/253 |
| 5,463,497 A | 10/1995 | Muraki et al. | 359/618 |
| 5,465,175 A | 11/1995 | Woodgate et al. | 359/463 |
| 5,467,106 A | 11/1995 | Salomon | 345/87 |
| 5,467,138 A | 11/1995 | Gove | 348/452 |
| 5,467,146 A | 11/1995 | Huang et al. | 348/743 |
| 5,469,302 A | 11/1995 | Lim | 359/846 |
| 5,471,341 A | 11/1995 | Warde et al. | 359/293 |
| 5,473,512 A | 12/1995 | Degani et al. | 361/760 |
| 5,475,236 A | 12/1995 | Yoshizaki | 257/48 |
| 5,480,839 A | 1/1996 | Ezawa et al. | 437/209 |
| 5,481,118 A | 1/1996 | Tew | 250/551 |
| 5,481,133 A | 1/1996 | Hsu | 257/621 |
| 5,482,564 A | 1/1996 | Douglas et al. | 134/18 |
| 5,482,818 A | 1/1996 | Nelson | 430/394 |
| 5,483,307 A | 1/1996 | Anderson | 953/98 |
| 5,485,172 A | 1/1996 | Sawachika et al. | 345/8 |
| 5,485,304 A | 1/1996 | Kaeriyama | 359/291 |
| 5,485,354 A | 1/1996 | Ciupke et al. | 362/31 |
| 5,486,698 A | 1/1996 | Hanson et al. | 250/332 |
| 5,486,841 A | 1/1996 | Hara et al. | 345/8 |
| 5,486,946 A | 1/1996 | Jachimowicz et al. | 359/263 |
| 5,488,431 A | 1/1996 | Gove et al. | 348/716 |
| 5,489,952 A | 2/1996 | Gove et al. | 348/771 |
| 5,490,009 A | 2/1996 | Venkateswar et al. | 359/291 |
| 5,491,510 A | 2/1996 | Gove | 348/77 |
| 5,491,612 A | 2/1996 | Nicewarner, Jr. | 361/760 |
| 5,491,715 A | 2/1996 | Flaxl | 375/344 |
| 5,493,177 A | 2/1996 | Muller et al. | 313/578 |
| 5,493,439 A | 2/1996 | Engle | 359/292 |
| 5,497,172 A | 3/1996 | Doherty et al. | 345/85 |
| 5,497,197 A | 3/1996 | Gove et al. | 348/388 |
| 5,497,262 A | 3/1996 | Kaeriyama | 359/223 |
| 5,499,060 A | 3/1996 | Gove et al. | 348/651 |
| 5,499,062 A | 3/1996 | Urbanus | 348/771 |
| 5,500,761 A | 3/1996 | Goossen et al. | 359/290 |
| 5,502,481 A | 3/1996 | Dentinger et al. | 348/51 |
| 5,504,504 A | 4/1996 | Markandey et al. | 345/214 |
| 5,504,514 A | 4/1996 | Nelson | 347/130 |
| 5,504,575 A | 4/1996 | Stafford | 356/330 |
| 5,504,614 A | 4/1996 | Webb et al. | 359/223 |
| 5,506,171 A | 4/1996 | Leonard et al. | 437/187 |
| 5,506,597 A | 4/1996 | Thompson et al. | 345/85 |
| 5,506,720 A | 4/1996 | Yoon | 359/224 |
| 5,508,558 A | 4/1996 | Robinette, Jr. et al. | 257/700 |
| 5,508,561 A | 4/1996 | Tago et al. | 257/737 |
| 5,508,565 A | 4/1996 | Hatakeyama et al. | 257/777 |
| 5,508,750 A | 4/1996 | Hewlett et al. | 348/558 |
| 5,508,840 A | 4/1996 | Vogel et al. | 359/291 |
| 5,508,841 A | 4/1996 | Lin et al. | 359/318 |
| 5,510,758 A | 4/1996 | Fujita et al. | 333/247 |
| 5,510,824 A | 4/1996 | Nelson | 347/239 |
| 5,512,374 A | 4/1996 | Wallace et al. | 428/422 |
| 5,512,748 A | 4/1996 | Hanson | 250/332 |
| 5,515,076 A | 5/1996 | Thompson et al. | 345/139 |
| 5,516,125 A | 5/1996 | McKenna | 279/3 |
| 5,517,340 A | 5/1996 | Doany et al. | 359/41 |
| 5,517,347 A | 5/1996 | Sampsell | 359/224 |
| 5,517,357 A | 5/1996 | Shibayama | 359/547 |
| 5,517,359 A | 5/1996 | Gelbart | 359/623 |
| 5,519,251 A | 5/1996 | Sato et al. | 257/666 |
| 5,519,450 A | 5/1996 | Urbanus et al. | 348/600 |
| 5,521,748 A | 5/1996 | Sarraf | 359/321 |
| 5,523,619 A | 6/1996 | McAllister et al. | 257/686 |
| 5,523,628 A | 6/1996 | Williams et al. | 257/777 |
| 5,523,803 A | 6/1996 | Urbanus et al. | 348/771 |
| 5,523,878 A | 6/1996 | Wallace et al. | 359/290 |
| 5,523,881 A | 6/1996 | Florence et al. | 359/561 |
| 5,523,920 A | 6/1996 | Machuga et al. | 361/767 |
| 5,524,155 A | 6/1996 | Weaver | 385/24 |
| 5,534,107 A | 7/1996 | Gray et al. | 156/643.1 |
| 5,534,883 A | 7/1996 | Koh | 345/3 |
| 5,539,422 A | 7/1996 | Heacock et al. | 345/8 |
| 5,544,306 A | 8/1996 | Deering et al. | 395/164 |
| 5,552,635 A | 9/1996 | Kim et al. | |
| 5,554,304 A | 9/1996 | Suzuki | 216/2 |
| 5,576,878 A | 11/1996 | Henck | 359/224 |
| 5,602,671 A | 2/1997 | Hornbeck | 359/224 |
| 5,606,181 A | 2/1997 | Sakuma et al. | 257/88 |
| 5,606,447 A | 2/1997 | Asada et al. | 359/199 |
| 5,610,438 A | 3/1997 | Wallace et al. | 257/682 |
| 5,623,361 A | 4/1997 | Engle | 359/291 |
| 5,629,566 A | 5/1997 | Doi et al. | 257/789 |
| 5,629,801 A | 5/1997 | Staker et al. | 359/572 |
| 5,640,216 A | 6/1997 | Hasegawa et al. | 349/58 |
| 5,658,698 A | 8/1997 | Yagi et al. | 430/11 |
| 5,661,592 A | 8/1997 | Bornstein et al. | 359/291 |
| 5,661,593 A | 8/1997 | Engle | 359/292 |
| 5,663,817 A | 9/1997 | Frapin et al. | 349/0.5 |
| 5,668,611 A | 9/1997 | Ernstoff et al. | 348/771 |

| Patent | Date | Inventor | Class |
|---|---|---|---|
| 5,673,139 A | 9/1997 | Johnson | 359/291 |
| 5,677,783 A | 10/1997 | Bloom et al. | 359/224 |
| 5,689,361 A | 11/1997 | Damen et al. | 359/284 |
| 5,691,836 A | 11/1997 | Clark | 359/247 |
| 5,694,740 A | 12/1997 | Martin et al. | 53/431 |
| 5,696,560 A | 12/1997 | Songer | 348/436 |
| 5,699,740 A | 12/1997 | Gelbart | 101/477 |
| 5,704,700 A | 1/1998 | Kappel et al. | 353/31 |
| 5,707,160 A | 1/1998 | Bowen | 400/472 |
| 5,712,649 A | 1/1998 | Tosaki | 345/8 |
| 5,713,652 A | 2/1998 | Zavracky et al. | 353/122 |
| 5,726,480 A | 3/1998 | Pister | 257/415 |
| 5,731,802 A | 3/1998 | Aras et al. | 345/148 |
| 5,734,224 A | 3/1998 | Tagawa et al. | 313/493 |
| 5,742,373 A | 4/1998 | Alvelda | 349/204 |
| 5,744,752 A | 4/1998 | McHerron et al. | 174/52.4 |
| 5,745,271 A | 4/1998 | Ford et al. | 359/130 |
| 5,757,354 A | 5/1998 | Kawamura | 345/126 |
| 5,757,536 A | 5/1998 | Ricco et al. | 359/224 |
| 5,764,280 A | 6/1998 | Bloom et al. | 348/53 |
| 5,768,009 A | 6/1998 | Little | 359/293 |
| 5,773,473 A | 6/1998 | Green et al. | 438/26 |
| 5,793,519 A | 8/1998 | Furlani et al. | 359/291 |
| 5,798,743 A | 8/1998 | Bloom | 345/90 |
| 5,798,805 A | 8/1998 | Ooi et al. | 349/10 |
| 5,801,074 A | 9/1998 | Kim et al. | 438/125 |
| 5,802,222 A | 9/1998 | Rasch et al. | 385/1 |
| 5,808,323 A | 9/1998 | Spaeth et al. | 257/88 |
| 5,808,797 A | 9/1998 | Bloom et al. | 359/572 |
| 5,815,126 A | 9/1998 | Fan et al. | 345/8 |
| 5,825,443 A | 10/1998 | Kawasaki et al. | 349/95 |
| 5,832,148 A | 11/1998 | Yariv | |
| 5,835,255 A | 11/1998 | Miles | 359/291 |
| 5,835,256 A | 11/1998 | Huibers | 359/291 |
| 5,837,562 A | 11/1998 | Cho | 438/51 |
| 5,841,579 A | 11/1998 | Bloom et al. | 359/572 |
| 5,841,929 A | 11/1998 | Komatsu et al. | |
| 5,844,711 A | 12/1998 | Long, Jr. | |
| 5,847,859 A | 12/1998 | Murata | 359/201 |
| 5,862,164 A | 1/1999 | Hill | 372/27 |
| 5,868,854 A | 2/1999 | Kojima et al. | 134/1.3 |
| 5,886,675 A | 3/1999 | Aye et al. | 345/7 |
| 5,892,505 A | 4/1999 | Tropper | 345/208 |
| 5,895,233 A | 4/1999 | Higashi et al. | 438/107 |
| 5,898,515 A | 4/1999 | Furlani et al. | 359/290 |
| 5,903,243 A | 5/1999 | Jones | 345/7 |
| 5,903,395 A | 5/1999 | Rallison et al. | 359/630 |
| 5,910,856 A | 6/1999 | Ghosh et al. | 359/291 |
| 5,912,094 A | 6/1999 | Aksyuk et al. | 430/5 |
| 5,912,608 A | 6/1999 | Asada | 335/222 |
| 5,914,801 A | 6/1999 | Dhuler et al. | 359/230 |
| 5,915,168 A | 6/1999 | Salatino et al. | 438/110 |
| 5,919,548 A | 7/1999 | Barron et al. | 428/138 |
| 5,920,411 A | 7/1999 | Duck et al. | 359/127 |
| 5,920,418 A | 7/1999 | Shiono et al. | 359/246 |
| 5,923,475 A | 7/1999 | Kurtz et al. | 359/619 |
| 5,926,309 A | 7/1999 | Little | 359/293 |
| 5,926,318 A | 7/1999 | Hebert | 359/291 |
| 5,942,791 A | 8/1999 | Shorrocks et al. | 257/522 |
| 5,949,390 A | 9/1999 | Nomura et al. | 345/32 |
| 5,949,570 A | 9/1999 | Shiono et al. | 359/291 |
| 5,953,161 A | 9/1999 | Troxell et al. | 359/618 |
| 5,955,771 A | 9/1999 | Kurtz et al. | 257/419 |
| 5,963,788 A | 10/1999 | Barron et al. | 438/48 |
| 5,978,127 A | 11/1999 | Berg | 359/245 |
| 5,982,553 A | 11/1999 | Bloom et al. | 359/627 |
| 5,986,634 A | 11/1999 | Alioshin et al. | 345/126 |
| 5,986,796 A | 11/1999 | Miles | 359/260 |
| 5,995,303 A | 11/1999 | Honguh et al. | 359/708 |
| 5,999,319 A | 12/1999 | Castracane | 359/573 |
| 6,004,912 A | 12/1999 | Gudeman | 508/577 |
| 6,012,336 A | 1/2000 | Eaton et al. | |
| 6,016,222 A | 1/2000 | Setani et al. | 359/571 |
| 6,025,859 A | 2/2000 | Ide et al. | 347/135 |
| 6,038,057 A | 3/2000 | Brazas, Jr. et al. | 359/291 |
| 6,040,748 A | 3/2000 | Gueissaz | 335/78 |
| 6,046,840 A | 4/2000 | Huibers | 359/291 |
| 6,055,090 A | 4/2000 | Miles | 359/291 |
| 6,057,520 A | 5/2000 | Goodwin-Johansson | 200/181 |
| 6,061,166 A | 5/2000 | Furlani et al. | 359/254 |
| 6,061,489 A | 5/2000 | Ezra et al. | 385/115 |
| 6,062,461 A | 5/2000 | Sparks et al. | 228/123.1 |
| 6,064,404 A | 5/2000 | Aras et al. | 345/507 |
| 6,069,392 A | 5/2000 | Tai et al. | 257/419 |
| 6,071,652 A | 6/2000 | Feldman et al. | 430/5 |
| 6,075,632 A | 6/2000 | Braun | 359/124 |
| 6,084,626 A | 7/2000 | Ramanujan et al. | 347/239 |
| 6,088,102 A | 7/2000 | Manhart | 356/354 |
| 6,090,717 A | 7/2000 | Powell et al. | 438/710 |
| 6,091,521 A | 7/2000 | Popovich | 359/15 |
| 6,096,576 A | 8/2000 | Corbin et al. | 438/108 |
| 6,096,656 A | 8/2000 | Matzke et al. | |
| 6,097,352 A | 8/2000 | Zavracky et al. | 345/7 |
| 6,101,036 A | 8/2000 | Bloom | 359/567 |
| 6,115,168 A | 9/2000 | Zhao et al. | 359/247 |
| 6,122,299 A | 9/2000 | DeMars et al. | 372/20 |
| 6,123,985 A | 9/2000 | Robinson et al. | 427/162 |
| 6,124,145 A | 9/2000 | Stemme et al. | 438/26 |
| 6,130,770 A | 10/2000 | Bloom | 359/224 |
| 6,144,481 A | 11/2000 | Kowarz et al. | 359/291 |
| 6,147,789 A | 11/2000 | Gelbart | 359/231 |
| 6,154,259 A | 11/2000 | Hargis et al. | 348/756 |
| 6,163,026 A | 12/2000 | Bawolek et al. | 250/351 |
| 6,163,402 A | 12/2000 | Chou et al. | 359/443 |
| 6,169,624 B1 | 1/2001 | Godil et al. | 359/237 |
| 6,172,796 B1 | 1/2001 | Kowarz et al. | 359/290 |
| 6,172,797 B1 | 1/2001 | Huibers | 359/291 |
| 6,177,980 B1 | 1/2001 | Johnson | 355/67 |
| 6,181,458 B1 | 1/2001 | Brazas, Jr. et al. | 359/290 |
| 6,188,519 B1 | 2/2001 | Johnson | 359/572 |
| 6,195,196 B1 | 2/2001 | Kimura et al. | 359/295 |
| 6,197,610 B1 | 3/2001 | Toda | 438/50 |
| 6,210,988 B1 | 4/2001 | Howe et al. | 438/50 |
| 6,215,579 B1 | 4/2001 | Bloom et al. | 359/298 |
| 6,219,015 B1 | 4/2001 | Bloom et al. | 345/87 |
| 6,222,954 B1 | 4/2001 | Riza | 385/18 |
| 6,229,650 B1 | 5/2001 | Reznichenko et al. | 359/566 |
| 6,229,683 B1 | 5/2001 | Goodwin-Johansson | 361/233 |
| 6,241,143 B1 | 6/2001 | Kuroda | 228/110.1 |
| 6,249,381 B1 | 6/2001 | Suganuma | |
| 6,251,842 B1 | 6/2001 | Gudeman | 508/577 |
| 6,252,697 B1 | 6/2001 | Hawkins et al. | 359/290 |
| 6,254,792 B1 | 7/2001 | Van Buskirk et al. | 216/13 |
| 6,261,494 B1 | 7/2001 | Zavracky et al. | 264/104 |
| 6,268,952 B1 | 7/2001 | Godil et al. | 359/291 |
| 6,271,145 B1 | 8/2001 | Toda | 438/706 |
| 6,271,808 B1 | 8/2001 | Corbin | 345/7 |
| 6,274,469 B1 | 8/2001 | Yu | 438/592 |
| 6,282,213 B1 | 8/2001 | Gutin et al. | |
| 6,290,859 B1 | 9/2001 | Fleming et al. | 216/2 |
| 6,290,864 B1 | 9/2001 | Patel et al. | 216/79 |
| 6,300,148 B1 | 10/2001 | Birdsley et al. | 438/15 |
| 6,303,986 B1 | 10/2001 | Shook | 257/680 |
| 6,310,018 B1 | 10/2001 | Behr et al. | 510/175 |
| 6,313,901 B1 | 11/2001 | Cacharelis | |
| 6,323,984 B1 | 11/2001 | Trisnadi | 359/245 |
| 6,342,960 B1 | 1/2002 | McCullough | 359/124 |
| 6,346,430 B1 | 2/2002 | Raj et al. | |
| 6,356,577 B1 | 3/2002 | Miller | 372/107 |
| 6,356,689 B1 | 3/2002 | Greywall | 385/52 |
| 6,359,333 B1 | 3/2002 | Wood et al. | 257/704 |
| 6,384,959 B1 | 5/2002 | Furlani et al. | 359/291 |

| | | | |
|---|---|---|---|
| 6,387,723 B1 | 5/2002 | Payne et al. ............... 438/48 |
| 6,392,309 B1 | 5/2002 | Wataya et al. ............. 257/796 |
| 6,396,789 B1 | 5/2002 | Guerra et al. .............. 369/112 |
| 6,418,152 B1 | 7/2002 | Davis |
| 6,421,179 B1 | 7/2002 | Gutin et al. ................ 359/572 |
| 6,438,954 B1 | 8/2002 | Goetz et al. |
| 6,445,502 B1 | 9/2002 | Islam et al. ................. 359/571 |
| 6,452,260 B1 | 9/2002 | Corbin et al. .............. 257/686 |
| 6,479,811 B1 | 11/2002 | Kruschwitz et al. |
| 6,480,634 B1 | 11/2002 | Corrigan ....................... 385/4 |
| 6,497,490 B1 | 12/2002 | Miller et al. ............... 359/614 |
| 6,525,863 B1 | 2/2003 | Riza .......................... 359/290 |
| 6,563,974 B2 | 5/2003 | Riza ............................ 385/18 |
| 6,569,717 B1 | 5/2003 | Murade |
| 2001/0019454 A1 | 9/2001 | Tadic-Galeb et al. ....... 359/649 |
| 2002/0015230 A1 | 2/2002 | Pilossof et al. ............ 359/558 |
| 2002/0021485 A1 | 2/2002 | Pilossof ..................... 359/295 |
| 2002/0079432 A1 | 6/2002 | Lee et al. ................... 250/216 |
| 2002/0105725 A1 | 8/2002 | Sweatt et al. ............... 359/566 |
| 2002/0112746 A1 | 8/2002 | DeYoung et al. ............ 134/36 |
| 2002/0131228 A1 | 9/2002 | Potter |
| 2002/0131230 A1 | 9/2002 | Potter ......................... 361/277 |
| 2002/0135708 A1 | 9/2002 | Murden et al. |
| 2002/0176151 A1 | 11/2002 | Moon et al. |
| 2002/0195418 A1 | 12/2002 | Kowarz et al. |
| 2002/0196492 A1 | 12/2002 | Trisnadi et al. |
| 2003/0056078 A1 * | 3/2003 | Johansson et al. .......... 711/200 |

FOREIGN PATENT DOCUMENTS

| | | | | |
|---|---|---|---|---|
| DE | 197 51 716 A1 | 5/1998 | .......... G02B/27/14 |
| DE | 198 46 532 C1 | 5/2000 | .......... G02B/27/09 |
| EP | 0 089 044 A2 | 9/1983 | .......... H01L/23/10 |
| EP | 0 261 901 A2 | 3/1988 | .......... G09G/3/36 |
| EP | 0 314 437 A1 | 10/1988 | .......... H01L/25/08 |
| EP | 0 304 263 A2 | 2/1989 | ........ H01L/25/065 |
| EP | 0 306 308 A2 | 3/1989 | .......... H04N/3/14 |
| EP | 0 322 714 A2 | 7/1989 | .......... G02B/5/30 |
| EP | 0 627 644 A3 | 9/1990 | .......... G02B/27/00 |
| EP | 0 417 039 A1 | 3/1991 | .......... G03B/21/20 |
| EP | 0 423 513 A2 | 4/1991 | .......... H01S/3/085 |
| EP | 0 436 738 A1 | 7/1991 | .......... H04N/5/74 |
| EP | 0 458 316 A2 | 11/1991 | .......... G06K/11/06 |
| EP | 0 477 566 A2 | 4/1992 | .......... G02B/26/08 |
| EP | 0 488 326 A3 | 6/1992 | .......... G09G/3/28 |
| EP | 0 499 566 A2 | 8/1992 | .......... G06F/3/033 |
| EP | 0 528 646 A1 | 2/1993 | .......... G09G/3/02 |
| EP | 0 530 760 A2 | 3/1993 | .......... G09G/3/34 |
| EP | 0 550 189 A1 | 7/1993 | .......... G02F/1/315 |
| EP | 0 610 665 A1 | 8/1994 | .......... G09G/3/34 |
| EP | 0 627 644 A2 | 12/1994 | .......... G02B/27/00 |
| EP | 0 627 850 A1 | 12/1994 | .......... H04N/5/64 |
| EP | 0 643 314 A2 | 3/1995 | .......... G02B/27/00 |
| EP | 0 654 777 A1 | 5/1995 | .......... G09G/3/34 |
| EP | 0 658 868 A1 | 6/1995 | .......... G09G/3/34 |
| EP | 0 658 830 A1 | 12/1995 | .......... G09G/3/34 |
| EP | 0 689 078 A1 | 12/1995 | .......... G02B/26/08 |
| EP | 0 801 319 A1 | 10/1997 | .......... G02B/26/00 |
| EP | 0 851 492 A2 | 7/1998 | ........ H01L/23/538 |
| EP | 1 003 071 A2 | 5/2000 | .......... G03B/27/72 |
| EP | 1 014 143 A1 | 6/2000 | .......... G02B/26/08 |
| EP | 1 040 927 A2 | 10/2000 | .......... B41J/2/455 |
| GB | 2 117 564 A | 10/1983 | .......... H01L/25/08 |
| GB | 2 118 365 A | 10/1983 | .......... H01L/27/13 |
| GB | 2 266 385 A | 10/1993 | .......... G02B/23/10 |
| GB | 2 296 152 A | 6/1996 | .......... H04N/13/04 |
| GB | 2 319 424 A | 5/1998 | .......... H04N/13/04 |
| JP | 53-39068 | 4/1978 | .......... H01L/23/12 |
| JP | 55-111151 | 8/1980 | .......... H01L/27/00 |
| JP | 57-31166 | 2/1982 | .......... H01L/23/48 |
| JP | 57-210638 | 12/1982 | .......... H01L/21/60 |
| JP | 60-49638 | 3/1985 | .......... H01L/21/60 |
| JP | 60-94756 | 5/1985 | .......... H01L/25/04 |
| JP | 60-250639 | 12/1985 | .......... H01L/21/58 |
| JP | 61-142750 | 6/1986 | .......... H01L/21/60 |
| JP | 61-145838 | 7/1986 | .......... H01L/21/60 |
| JP | 63-234767 | 9/1988 | .......... H04N/1/04 |
| JP | 63-305323 | 12/1988 | .......... G02F/1/13 |
| JP | 1-155637 | 6/1989 | .......... H01L/21/66 |
| JP | 40-1155637 | 6/1989 | .......... H01L/21/92 |
| JP | 2219092 | 8/1990 | .......... G09G/3/28 |
| JP | 4-333015 | 11/1992 | .......... G02B/27/18 |
| JP | 7-281161 | 10/1995 | ........ G02F/1/1333 |
| JP | 3288369 | 3/2002 | .......... G02B/26/06 |
| WO | WO 90/13913 | 11/1990 | .......... H01L/23/10 |
| WO | WO 92/12506 | 7/1992 | .......... G09F/9/37 |
| WO | WO 93/02269 | 2/1993 | .......... E06B/5/10 |
| WO | WO 93/09472 | 5/1993 | .......... G03F/7/20 |
| WO | WO 93/18428 | 9/1993 | .......... G02B/2/00 |
| WO | WO 93/22694 | 11/1993 | .......... G02B/5/18 |
| WO | WO 94/09473 | 4/1994 | .......... G09G/3/34 |
| WO | WO 94/29761 | 12/1994 | .......... G02B/27/24 |
| WO | WO 95/11473 | 4/1995 | .......... G02B/27/00 |
| WO | WO 96/02941 | 2/1996 | .......... H01L/23/02 |
| WO | WO 96/08031 | 3/1996 | .......... H01J/29/12 |
| WO | WO 96/41217 | 12/1996 | .......... G02B/5/18 |
| WO | WO 96/41224 | 12/1996 | .......... G02B/19/00 |
| WO | WO 97/22033 | 6/1997 | .......... G02B/27/22 |
| WO | WO 97/26569 | 7/1997 | .......... G02B/5/18 |
| WO | WO 98/05935 | 2/1998 | .......... G01L/9/06 |
| WO | WO 98/24240 | 6/1998 | .......... H04N/9/31 |
| WO | WO 98/41893 | 9/1998 | .......... G02B/26/08 |
| WO | WO 99/07146 | 2/1999 | .......... H04N/7/16 |
| WO | WO 99/12208 | 3/1999 | ........ H01L/25/065 |
| WO | WO 99/23520 | 5/1999 | .......... G02B/26/08 |
| WO | WO 99/34484 | 7/1999 | |
| WO | WO 99/59335 | 11/1999 | .......... H04N/5/765 |
| WO | WO 99/63388 | 12/1999 | .......... G02B/27/22 |
| WO | WO 99/67671 | 12/1999 | .......... G02B/26/08 |
| WO | WO 00/04718 | 1/2000 | .......... H04N/7/167 |
| WO | WO 00/07225 | 2/2000 | .......... H01L/21/00 |
| WO | WO 01/04674 A1 | 1/2001 | .......... G02B/6/12 |
| WO | WO 01/006297 A3 | 1/2001 | .......... G02B/27/10 |
| WO | WO 01/57581 A3 | 8/2001 | .......... G02B/27/48 |
| WO | WO 02/025348 A3 | 3/2002 | .......... G02B/26/02 |
| WO | WO 02/31575 A2 | 4/2002 | .......... G02B/27/00 |
| WO | WO 02/058111 A2 | 7/2002 | |
| WO | WO 02/065184 A3 | 8/2002 | .......... G02B/27/12 |
| WO | WO 02/073286 A2 | 9/2002 | .......... G02B/26/08 |
| WO | WO 02/084375 A1 | 10/2002 | .......... G02B/26/08 |
| WO | WO 02/084397 A3 | 10/2002 | .......... G02B/27/18 |
| WO | WO 03/001281 A1 | 1/2003 | .......... G02F/1/01 |
| WO | WO 03/001716 A1 | 1/2003 | .......... H04J/14/02 |
| WO | WO 03/012523 A1 | 2/2003 | .......... G02B/26/00 |
| WO | WO 03/016965 A1 | 2/2003 | .......... G02B/5/18 |
| WO | WO 03/023849 A1 | 3/2003 | .......... H01L/23/02 |
| WO | WO 03/025628 A2 | 3/2003 | |

OTHER PUBLICATIONS

O. Solgaard, "Integrated Semiconductor Light Modulators for Fiber–Optic and Display Applications", Ph.D. Dissertation, Stanford University Feb., 1992.

J. Neff, "Two–Dimensional Spatial Light Modulators: A Tutorial", Proceedings of the IEEE, vol. 78, No. 5 (May 1990), pp. 826–855.

R. Gerhard–Multhaupt, "Viscoelastic Spatial Light Modulators and Schlieren–Optical Systems for HDTV Projection Displays" SPIE vol. 1255 Large Screen Projection Displays 11 (1990), pp. 69–78.

R. Gerhard–Multhaupt, "Light–Valve Technologies for High–Definition Television Projection Displays", Displays vol. 12, No. 3/4 (1991), pp. 115–128.

O. Solgaard, F. Sandejas, and D. Bloom, "Deformable Grating Optical Modulator," Optics Letters, vol. 17, No. 9, May 1, 1992, New York, USA, pp. 688–690.

F. Sandejas, R. Apte, W. Banyai, and D. Bloom, "Surface Microfabrication of Deformable Grating Valve for High Resolution Displays," The 7 International Conference on Solid–State Sensors and Actuators.

P. Alvelda, "High Efficiency Color Microdisplays," SID 95 Digest, pp. 307–311, 1995.

Worboys et al., "Miniature Display Technology for Integrated Helmut Systems," GEC Journal of Research, vol. 10, No. 2, pp. 111–118, Chemsford, Essex, GB 1993.

M. Farn et al., "Color Separation by use of Binary Optics," Optics Letters, vol. 18:15 pp. 1214–1216, 1993.

P. Alvelda, "VLSI Microdisplays and Optoelectric Technology," MIT, pp. 1–93, 1995.

P. Alvelda, "VLSI Microdisplay Technology," Oct. 14, 1994.

D. Rowe, "Laser Beam Scanning," SPIE, vol. 2088, Oct. 5, 1993, 18–26.

L. Hornbeck, "Deformable–Mirror Spatial Light Modulators," Spatial Light Modulators and Applications III, Aug. 8, CA 1989, pp. 86–102.

Russick et al., "Supercritical Carbon Dioxide Extraction of Solvent from Micromachined Structures," Supercritical Fluids, Chapter 18, American Chemical Society, pp 255–269, 1997.

Buhler et al., "Linear Array of Complementary Metal Oxide Semiconductor Double–Pass Metal Micromirrors," Optical Engineering, vol. 36, No. 5, pp 1391–1398, May 1997.

Gani et al., "Variable Gratings for Optical Switching: Rigorous Electromagnetic Simulation and Design," Optical Engineering, vol. 38, No. 3, pp 552–557, Mar. 1999.

R. Tepe, et al., "Viscoelastic Spatial Light Modulator with Active Matrix Addressing," Applied Optics, vol. 28, No. 22, New York, USA, pp. 4826–4834, Nov. 15, 1989.

W. Brinker, et al., "Deformation Behavior of Thin Viscoelastic Layers Used in an Active–Matrix–Addressed Spatial Light Modulator," SPIE vol. 1018, pp. 79–85, Germany, 1988.

T. Utsunomiya and H. Sato, "Electrically Deformable Echellette Grating and its Application to Tunable Laser Resonator," Electronics and Communications in Japan, vol. 63–c, No. 10, pp. 94–100, Japan, 1980.

Burns, D.M. et al., *Development of microelectromechanical variable blaze gratings*, Sensors and Actuators A, pp. 7–15, 1998.

R.N. Thomas, et al., "The Mirror–Matrix Tube: A Novel Light Valve for Projection Displays", IEEE Transactions on Electron Devices, vol. ED–22, No. 9, pp. 765–775, Sep. 1975.

J. Guldberg, et al., "An Aluminum/SiO2/Silicon–on–Sapphire Light Valve Matrix for Projection Displays," Applied Physics Letters, vol. 26, No. 7, pp. 391–393, Apr. 1975.

"Kitchen Computer", IBM Technical Disclosure Bulletin, vol. 37, No. 12, pp. 223–225, Dec. 1994.

"Image Orientation Sensing and Correction for Notepads", Research Disclosure, No. 34788, p. 217, Mar. 1993.

Beck Mason et al., "Directly Modulated Sampled Grating DBR Lasers for Long–Haul WDM Communication Systems" IEEE Photonics Technology Letters, vol. 9, No. 3, Mar. 1997 pp. 377 of 379.

N.J. Frigo et al., "A Wavelength–Division Multiplexed Passive Optical Network with Cost–Shared Components", IEEE Photonics Technology Letters, vol. 7, No. 11, Nov. 1994, pp. 1365 of 1367.

M.S. Goodman et al., "The LAMBDANET Multiwavelength Network: Architecture, Applications, and Demonstrations", IEEE Journal on Selected Areas in Communications, vol. 8, No. 6, Aug. 1990, pp. 995 of 1004.

C. A. Turkatte, "Examining the Benefits of Tunable Lasers for Provisioning Bandwidth on Demand", EuroForum—Optical Components, Feb. 2001, pp. 1 of 10.

R. Plastow, "Tunable Lasers and Future Optical Networks", Forum—Tunable Lawer, Aug. 2000, pp. 58 of 62.

Elizabeth Bruce, "Tunable Lasers", Communications, IEEE Spectrum, Feb. 2002, pp. 35 of 39.

M. G. Littman et al., "Spectrally Narrow Pulsed Dye Laser without Beam Expander", Applied Optics, vol. 17, No. 14, Jul. 15, 1978, pp. 2224 of 2227.

Apte et al., "Deformable Grating Light Valvcs for High Resolution Displays," Solid State Actuator Workshop, Hilton Head, South Carolina, Jun. 13–16, 1994.

Sene et al., "Polysilicon micromechanical gratings for optical modulation," Sensors and Actuators, vol. A57, pp. 145–151, 1996.

Amm et al., "Invited Paper: Grating Light Valvc™ Technology: Update and Novel Applications," SID Digest, vol. 29, 1998.

Development of Digital MEMS–Based Display Technology Promises Improved Resolution, Contrast and Speed, XP–000730009, 1997, pp. 33 of 34.

"Micromachined Opto/Electro/Mechanical Systems," Electronic Systems, NASA Tech Briefs, Mar. 1997, pp. 50 & 52.

S.T. Pai, et al., "Electromigration in Metals", Received Jun. 4, 1976, p. 103–115.

Olga B. Spahn, et al., "High Optical Power Handling of Pop–Up Microelectromechanical Mirrors", Sandis National Laboratories, IEEE 2000, p. 51–52.

David M. Burns, et al. "Optical Power Induced Damage to Microelectromechanical Mirrors", Sensors and Actuators A 70, 1998, p. 6–14.

V.S. Aliev et al., "Development of Si(100) surface roughness at the initial stage of etching in F2 and XcF2 gases: ellipsometric study," Surface Science 442 (1999), pp. 206–214.

Xuan–Qi Wang et al., "Gas–Phase Silicon Etching with Bromine Trifluoride," Depart. of Electrical Engineering. 136–93 California Institute of Technology, 1997 IEEE pp. 1505–1508.

Harold F. Winters, "Each products from the reaction of XeF2 with SiO2, Si3N4, SiC, and Si in the presence of Ion Bombardment," IBM Research Laboratory, 1983 American Vacuum Society, pp. 927–931.

F.A. Houle, "Dynamics of SiF4 desorption during etching of silicon by XeF2,"J. Chem. Phys. 87 (3), Aug. 1, 1987, pp. 1866–1872.

Mehran Mehregany, "Microelectromechanical Systems," 1993 IEEE, pp. 14–22.

D. Moser et al., "A CMOS Compatible Thermally Excited Silicon Oxide Beam Resonator with Aluminium Mirror," Physical Electronics Laboratory, 1991 IEEE, pp. 547–550.

M. Parameswaran et al., "Commercial CMOS Fabricated Integrated Dynamic Thermal Scene Simulator," 1991 IEEE, pp. 29.4.1–29.4.4.

M. Parameswaran et al., "CMOS Electrothermal Microactuators," Depart. of Electrical Engineering. 1990 IEEE, pp. 128–131.

U. Streller et al., "Selectivity in dry etching of Si(100) with XeF2 and VUV light," Applied Surface Science 106, (1996), pp. 341–346.

M.J.M. Vugts et al., "Si/XeF2 etching: Temperature dependence," 1996 American Vacuum Society, pp. 2766–2774.

P. Krummenacher et al., "Smart Temperature Sensor in CMOS Technology," Sensors and Actuators, A–21–A–23 (1990),pp. 636–638.

Henry Baltes, "CMOS as sensor technology," Sensors and Actuators A. 37–38, (1993),pp. 51–56.

Thomas Boltshauser et al., "Piezoresistive Membrane Hygrometers Based on IC Technology," Sensor and Materials, 5,3, (1993), pp. 125–134.

Z. Parpis et al., "Modelling of CMOS Compatible High Voltage Device Structures," pp. 41–50.

Jon Gildemeister, "Xenon Difluoride Etching System," 1997, UC Berkeley MicroTabrication Manual Chapter 7.15, p. 2–5.

W. Riethmuller et al., "A smart accelerometer with on–chip electronics fabricated by a commercial CMOS process," Sensors and Actuators A. 31, (1992), 121–124.

W. Gopel et al., "Sensors—A Comprehensive Survey," vol. 7, Weinheim New York, 44 pgs.

D. E. Ibbotson et al., "Comparison of XeF2 and F–atom reations with Si and SiO2," 1984 American Institute of Physics, pp. 1129–1131.

D. E. Ibbotson et al., "Plasmaless dry etching of silicon with fluorine–containing compounds," 1984 American Institute of Physics, pp. 2939–2942.

M.H. Hecht et al., "A novel x–ray photoelectron spectroscopy study of the Al/SiO2 interfaces, " 1985 American Institute of Physics, pp. 5256–52616.

Daniel L. Flamm et al., "XeF2 and F–Atom Reactions with Si: Their Significance for Plasma Etching," Solid State Technology, V. 26, #4, 4/83, pp. 117–121.

H.F. Winters et al., "the etching of silicon with XeF2 vapor," Appl. Phys. Lett. vol. 34, No. 1, Jan. 1979, pp. 70–73.

Wayne Bailey et al., "Microelectronic Structures and Microelectromechanical Devices for Optical Processing and Multimedia Applications," SPIE—The International society for Optical Engineering, vol. 2641, Oct. 1995, 13 pgs.

J. Marshall et al., "Realizing Suspended Structures on Chips Fabricated by CMOS Foundry Processes Through the MOSIS Service," National Inst. of Standards and Technology, Jun 94, 63 pgs.

David Moser et al., "CMOS Flow Sensors," 1993 Physical Electronics Lab, Swiss Federal Institute of Tech, Zurich, Switzerland, 195 pgs.

E. Hecht, "Optics", Addison–Wesley, $2^{nd}$ edition, 1987, Adelphi University, pp. 163–169.

E. Hecht, "Optics", Addison–Wesley, $2^{nd}$ edition, 1987, Adelphia University, pp. 358–360.

T. Glaser et al., "Beam switching with binary single–order diffractive grating", XP–000802142, Optics Letters, Dec. 15, 1998, vol. 23, No. 24, pp. 1933 of 1935.

P.C. Kundu et al., "Reduction of Speckle Noise by Varying the Polarisation of Illuminating Beam", XP–002183475, Dept. of Applied Physics, Calcutta University, 1975, pp. 63–67.

J. W. Goodman, "Some Fundamental Properties of Speckle", XP–002181682, Dept. of Electrical Engineering, Stanford University, 1976, pp. 1146–1150.

Lingli Wang et al., "Speckle Reduction in Laser Projection Systems by Diffractive Optical Elements", XP–000754330, Applied Optics, Apr. 1, 1998, vol. 37, No. 10, pp. 1770–1775.

R.W. Corrigan et al., "Calibration of a Scanned Linear Grating Light–Valve, Projection System for E–Cinema Applications", Silicon Light Machines, SID'99, San Jose, CA, 27 pgs, 1999.

R.W. Corrigan et al., "Calibration of a Scanned Linear Grating Light–Valve, Projection System", Silicon Light Machines, San Jose, CA, 4 pgs. May 18, 1999.

"Introduction to Cryptography",http://www.ssh.fi/tech/crpto/into.html, 35 pgs. Jun. 21, 1999.

"Deep Sky Black," Equinox Interscience, www.eisci.com/deepsky.html, 1997.

"Absorptive Neutral Density Filters," Newport Corp., Irvine, CA, www.newport.com, May 7, 1999.

"High Energy Variable Attenuators," Newport Corp., Irvine, CA, www.newport.com, May 7, 1999.

"Neutral–Density Filters," New Focus, Inc., Santa Clara, CA, www.newfocus.com, May 7, 1999.

J. Hawkes et al., "Laser Theory and Practice," Prentice Hall, New York, 1995, pp. 407–408.

C. Tew et al., "Electronic Control of a Digital Micromirror Device for Projection Displays", Proceedings of the 1994 IEEE International Solid–State Circuits Conference, 1994.

Henek, S.A., "Lubrication of Digital Micromirror Devices™", Tribology Letters, No. 3, pp. 239–247, 1997.

K. W. Goossen et al., "Silicon Modulator Based on Mechanically–Active Anti–Reflection Layer with 1 Mbit/sec Capability for Fiber–in–the–Loop Applications", IEEE Protonics Technology Letters, vol. 6, No. 9, Sep. 1994, pp. 1119–1121.

J. A. Walker et al., "Demonstration of a Gain Flattened Optical Amplifier with Micromechanical Equalizer Element", Lucent Technologies, pp. 13–14.

A. P. Payne et al., "Resonance Measurements of Stresses in $Al/S_4N_4$ Micro–Ribbons", Silicon LIght Machines, Sep. 22, 1999, 11 pgs.

M. W. Miles, "A New Reflective FPD Technology Using Interferometric Modulation", 4 pgs.

N. A. Riza et al., "Digitally Controlled Fault–Tolerant Multiwavelength Programmable Fiber–Optic Attenuator Using a Two–Dimensional Digital Micromirror Device", Optics Letters, Mar. 1, 1999, vol. 24, No. 5, pp. 282–284.

N. A. Riza et al., "Synchronous Amplitude and Time Control for an Optimum Dynamic Range Variable Photonic Delay Line", Applied Optics, Apr. 10, 1999, vol. 38, No. 11, pp. 2309–2318.

P. Alvelda et al., "44.4: Ferroelectric Microdisplays Using Distortion–Compensated Pixel Layouts", SID 95 Digest, XP 2020715, pp. 931–933.

* cited by examiner

METHOD FOR DOMAIN PATTERNING IN LOW COERCIVE FIELD FERROELECTRICS

FILED OF THE INVENTION

The invention relates to ferroelectric materials. More specifically, the invention relates to ferroelectric materials with patterned domain structures.

BACKGROUND OF INVENTION

Nonlinear materials are used in a variety of technologies including data storage, display and communications technologies. Nonlinear materials and their effects with interacting electromagnetic radiation is well documented. Nonlinear materials are used as harmonic generators. Most commonly, nonlinear materials are used to generated the second harmonic emission light wave $\lambda_e$ of an interacting light source with a fundamental wavelength $\lambda_i$. FIG. 1, for example, shows a single pass second harmonic generator construction 100. A solid state infrared laser 101 emits light with a fundamental wavelength 107. The light wave 107 is focused with a confocal lense 103 on a crystal 104 that is formed from a nonlinear material. The emission second harmonic wavelength 109 is half of the fundamental wavelength 107; equivocally the second harmonic output frequency is twice that of the fundamental input frequency. The nonlinear crystal 104 needs to be transparent to incident light with a wavelength 107 so that the light wave 107 can propagate through the crystal 104. Further, the crystal 104 needs to be transparent the to second harmonic light with a wavelength 109 so that the second harmonic light wave 109 is emitted from the crystal 104.

There are several factors that lead to inefficient conversion of the fundamental wave length 107 to the second harmonic wavelength 109. Specifically, low nonlinear coefficient of crystal material, defects in the crystal structure, low transparency of the nonlinear material, and other geometric considerations of the crystal can all lead to inefficient conversion of the fundamental wavelength 107 to the second harmonic wavelength 109. A crystal structure that is made from a material with a small nonlinear coefficient can in theory be compensated for by increasing the crystal pass length L. In practice, however, local defects and variations in refractive index throughout the crystal 104 begin to diminish any benefits gained from extending the crystal path length.

Even when the crystal 104 is formed from a material that exhibits a large nonlinear coefficient, the actual observed conversion efficiency of the fundamental wavelength 107 to its corresponding harmonic wavelength 109 is typically low. This is because light with a wavelength 107 and 109 exhibits different indices of refraction within the crystal 104. Hence, the fundamental wavelength 107 and the harmonic wavelength 109 have different phase velocities as they propagate through the crystal 104. Consequently, as the second harmonic wave 109 is locally generated in one portion of the crystal, it will be out of phase with the fundamental wavelength 107 and with the second harmonic wave 109 that is locally generated in a later part of the crystal 104 resulting in destructive interference and low output of the second harmonic light. To help overcome this problem, nonlinear materials are modified. Nonlinear materials are modified either so that the phase velocities of $\lambda_e$ and $\lambda_i$ are matched, a method referred to a bifringent phase matching, or alternatively the nonlinear materials are modified such that the sign of the nonlinear coefficient is periodically modulated by a distance corresponding to the coherence length of the light, a method referred to a quasi-phase matching (QPM) and described in an early work by J. A. Armstrong, N. Bloembergen, J. Ducuing and P. S. Pershan in "Interaction Between Light Waves in a Nonlinear Dielectric," Phys. Rev., 127, 1918, 1962.

QPM is a method which compensates for the differences in the phase velocity between the fundamental wavelength of the interacting light source and the corresponding harmonic wavelength within the nonlinear crystal. In quasi-phase matching, the fundamental wave and the harmonic wave still have different phase velocities, but they are shifted $\pi$ out of phase relative to one another over the coherence length. The coherence length is used to refer to the distance over which two traveling waves slip out of phase by $\pi$ radians. The sign of the non-linear coefficient is reversed once every coherence length (or odd multiples of coherence lengths) causing a locally generated harmonic field within the nonlinear structure to transfer power to the harmonic beam. By compensating for the phase velocity mismatch between the fundamental wave and the harmonic wave in this way, all the elements of the crystal nonlinear tensor can be accessed throughout the entire transparency range of the crystal. This invention is directed to improved materials and methods for making quasi-phase matching structures preferably for use in non-linear optics.

SUMMARY OF THE INVENTION

The invention provides a method for domain patterning of nonlinear ferroelectric materials. The method is particularly useful for domain patterning of ferroelectric structures which exhibit low coercive fields and which exhibit charging with small changes in temperature. The method seeks to reduce the formation of random micro-domains that typically result during thermal cycling of ferroelectric materials and which lead to patterning defects and reduced efficiencies. According to the preferred method of the invention, a ferroelectric structure is provided with conductive layers on the top surface and the bottom surface of the structure which correspond to surfaces that are normal to the crystallographic polarization axis or z-polarization vectors. The conductive layer is a conductive polymer, a metal layer or a layer of conductive polymer composition. Preferably, the conductive layers are formed from a mixture of polyaniline salt, n-Methyl pyrrolidone and Isopropanol, available under the name of ORMECON™ D-1000 manufactured by Ormecon Chemie GmbH & Co. KG, Ferdinand-Harten-Str. 7, D-22949, Ammersbek, Germany.

A mask is provided over a patterning surface of the structure. For simplicity, the patterning surface is referred to herein as the top surface of the structure. The mask preferably substantially replicates the intended domain pattern. Portions of the conductive layer on the top surface of the structure are removed in accordance with the pattern of the mask, thus leaving a conductive domain template on the top surface of the structure. Subsequently, a sufficient bias voltage is applied to the conductive domain template and the conductive layer on the bottom surface of the structure, thereby producing a domain patterned ferroelectric structure. The conductive layer, the mask and the conductive domain template are then preferably removed from the structure. The resulting domain patterned ferroelectric structure is then relatively stable against charging effects due to temperature variations. A final protective conductive coating may be applied to provide additional long-term stability of the domain pattern.

The mask is preferably provided by lithographic techniques by using lithographic materials. Accordingly, a portion of the conductive layer on the top surface of the ferroelectric structure is coated with a photo-resist such by any suitable method. After the photo-resist is coated on the top conductive layer, the photo-resist is thermal cycled in accordance with the manufacturer's recommendations. The photo-resist is then exposed according to a predetermined pattern with a suitable light source and developed to form the mask.

During thermal cycling of the photo-resist, charging on the surfaces of the ferroelectric typically occurs leading to electron emission and random domain formation during cooling. In order to mitigate the charging of the structure during thermal cycling of photo-resist, it is preferable that the conductive layers on the top surface and the bottom surface are placed in electrical communication prior to-thermal cycling, thus reducing the charging. The top and bottom conductive layers are preferably placed in electrical communication by providing a conductive layer to a side surface of the ferroelectric structure.

After the mask is formed and prior to creating the domain patterning, the conductive layer on the top and bottom surfaces of the structure is placed in electrical isolation by removing the conductive layer from the side surface of the structure and applying a sufficient bias voltage across the top and bottom conductive layers. This urges the ferroelectric structure to assume a single domain structure, wherein the signs of the polarization vectors are in one direction throughout the structure. The voltage that is required to uniformly polarize the structure depends on the ferroelectric material used, but is approximately 21 KV/mm or less for many ferroelectric materials and is defined by the coercive field Ec of the material used to form the structure and the thickness of the structure.

After the mask is formed and the structure is uniformly polarized, portions of the conductive layer on the top surface are removed in accordance with the mask to form a conductive domain template. A sufficient reverse bias voltage is then applied across the conductive domain template and the conductive layer on the bottom surface of the ferroelectric structure causing the regions of the structure between the domain template and the conductive layer on the bottom surface to reverse their polarization, thereby creating the domain patterning throughout the ferroelectric structure.

The ferroelectric structure is preferably formed from $LiNbO_3$, $KTiOPO_4$ and $LiTaO_3$. Most preferably, the ferroelectric structure is a stoichiometric $LiNbO_3$ or $LiTaO_3$ wafer which exhibits a low coercive field. Further, the domain patterned ferroelectric structure is preferably a quasi-phase matching structure wherein the domains are spatially modulated by a distance corresponding to a coherence length required for generating a harmonic emission wave form with a wavelength $\lambda_e$ from a fundamental wave form of an interacting light source with a wavelength $\lambda_i$.

A harmonic generator for generating a harmonic emission wave form utilizes the quasi-phase matching structure of the instant invention formed from a ferroelectric material which exhibits spontaneous reversal of local polarizations by changes in temperature $\Delta T$ between 0.1 and 40 degrees, wherein $\Delta T_i = q^{-1} \cdot \xi \cdot E_c$, q is the pyroelectric coefficient, $\xi$ is the permitivity of the ferroelectric and $E_c$ is the coercive field. An interacting light source, with the fundamental wavelength $\lambda_i$ is configured to be incident with the quasi-phase matching structure such that a portion of the light with the wavelength $\lambda_i$ interacts with the quasi-phase matching structure generating the harmonic emission wave form with a wavelength $\lambda_e$.

DETAILED DESCRIPTION OF THE INVENTION

Figure 1:
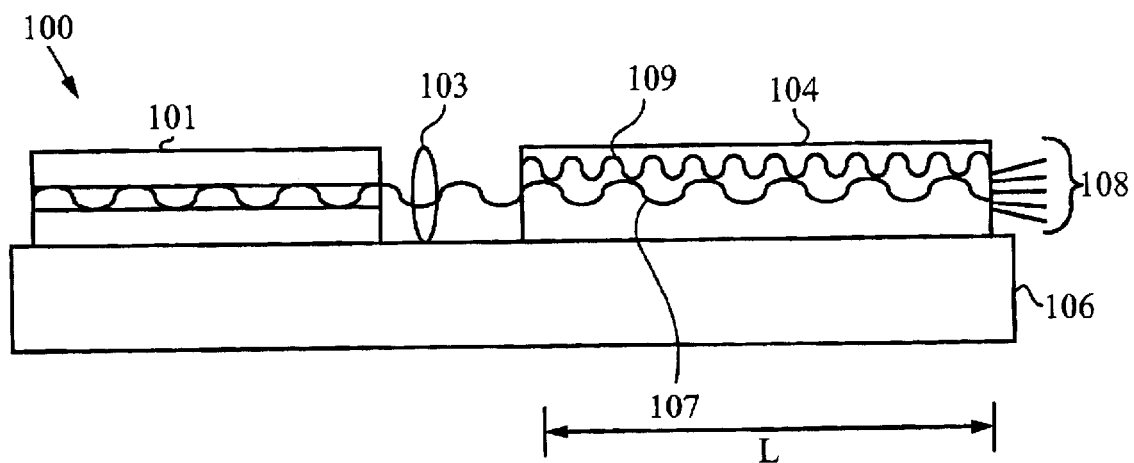
FIG. 1 is a schematic representation of a harmonic generator.

In general, the present invention is for domain patterning of ferroelectric materials used in nonlinear optics and related applications. ferroelectric materials such as $LiNbO_3$, $KTiOPO_4$ and $LiTaO_3$ have been implicated as suitable candidates in QPM structures. When exposed to sufficient changes in temperature, ferroelectric materials produce a surface charge. The surface charge gives rise to an electric field having a component that is parallel to the polar axis of the ferroelectric material. This phenomenon is called the pyroelectric effect. Some ferroelectric materials such as $LiNbO_3$ and $LiTaO_3$, produce a surface charge that produces such an anti-polar electric field during cooling, while other materials produce an anti-polar electric field during heating, both of which can lead to spontaneous reversal in the sign of the local polarization vector. This spontaneous reversal in the sign of the local polarization vector produces random micro domains in the structure. The process of reversing the sign of the local polarization vector is referred to as poling. The change in temperature that is required to cause the spontaneous reversal of the local polarization is given by $\Delta T = q^{-1} \cdot \xi \cdot E_c$, where q is the pyroelectric coefficient, $\xi$ is the permitivity of the ferroelectric and $E_c$ is the coercive field. In congruent lithium tanatlate, for example, an anti-polar field sufficient to cause the sign of polarization vectors to spontaneously switch is generated at a $\Delta T$ of approximately 50 degrees Kelvin, wherein the coercive field value of the material is 21 kV/mm. In commercially available stoichiometric lithium tanatlate, such as available by Oxide Corporation, 9633 Kobuchizawa, Kitakoma, Yamanashi, 408-0044 Japan, the coercive field is much lower, approximately 1.7 kV/mm. This lower coercive field reduces the temperature decrease that results in poling to approximately 4.0 degrees.

To achieve periodic domain inversion or domain patterning on the surfaces of ferroelectric materials, dopant infusion has been employed; for example, see E. J. Lim, M. M. Fejer, and R. L. Byer, "Second-Harmonic Generation of Green Light in Periodically Poled Planar Lithium Niobate Waveguides," Electronics Letters, 25 (3), pp. 174–175, 1989. In order to achieve bulk periodic domain formation, lithographic techniques have been employed, whereby the domains are defined by lithographic techniques and a sufficient electric field is applied to the ferroelectric material to cause inversion of the nonlinear coefficient. For early work describing using lithographic techniques for domain patterning, see M. Yamamada, N. Nada, M. Saitoh et al., "First Order Quasi-Phase Matched $LiNbO_3$ waveguide Periodically Poled by Applying an External Field for Efficient Blue Second-Harmonic Generation," Applied Physics Letters, 62 (5), pp. 435–436, 1993.

Unfortunately Lithographic processes and other wafer processing steps typically involve thermal cycling $\Delta T$ that can be on the order of 100 degrees or more and can readily result in the formation of random micro-domains. The formation of random micro domains in the ferroelectric material results in defects in subsequently produced domain patterned structures and degrades the performance of the QPM device produced therefrom. Therefore, there is a need for an improved method for making periodic domain patterned structures from ferroelectric materials, wherein high resolution domain patterning is achieved using lithographic techniques, but where the formation of random micro domains is reduced during thermal cycling processes.

Per the above equation, spontaneous poling or micro domain formation is even more problematic for low coercive field Ferromagnetic materials. A Stoichiometric $LiNbO_3$ or $LiTaO_3$ wafer exhibits a low coercive field value which can be as low as 1/100 of that of the parent wafer or less. Consequently, spontaneous local reversal of sign of polarization vectors can occur at a fraction of the $\Delta T$ observed for conventional congruently grown wafers.

There are several potential advantages to using these low coercive field ferroelectric materials. In some ferroelectric materials, a lowered coercive field can result in substantial improvement in domain patterning. Further, some domain patterned low coercive field materials show good optical stability.

Figure 2:
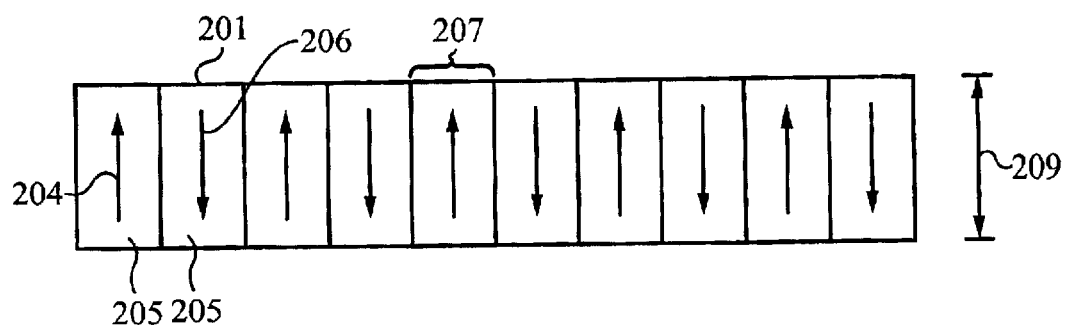
FIG. 2 is a schematic representation of a periodically poled nonlinear structure.
Figure 3:
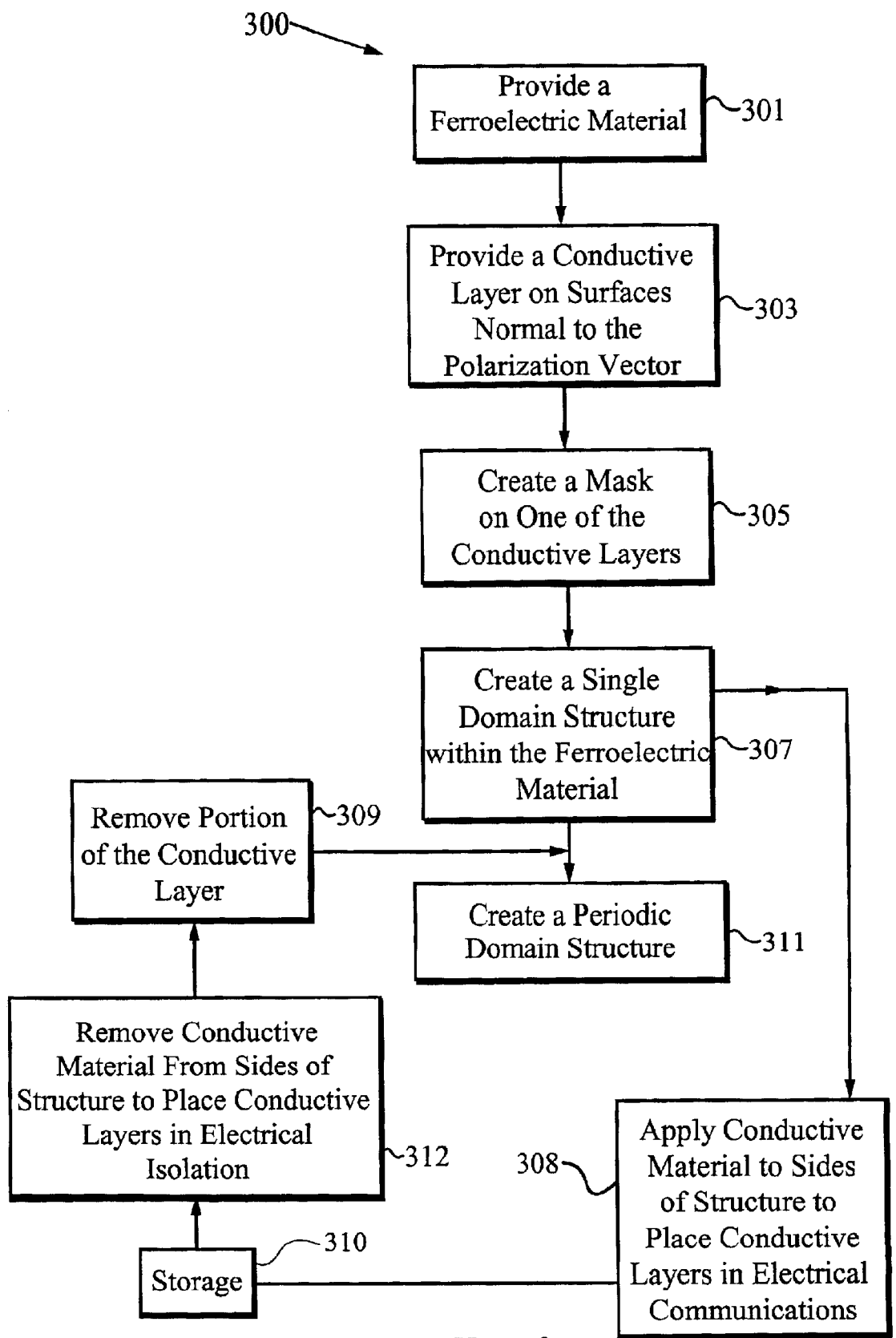
FIG. 3 is a block flow diagram outlining the method for making a periodic domain patterned ferroelectric structure in accordance with the invention.

FIG. 2 is a schematic representation of a periodically poled nonlinear structure 203. The structure has alternating domains 203 and 205, wherein the sign of the respective polarization vectors 204 and 206 alternate. The preferred separation of alternating domains are discussed by J. A. Armstrong, N. Bloembergen, J. Ducuing and P. S. Pershan in "Interaction Between Light Waves in a Nonlinear Dielectric," Phys. Rev., 127, 1918, 1962. The polarization in a domain of the structure 201 can be poled or switched by applying the sufficient bias voltage across the top surface and the bottom surface of the structure 201 which is normal to the polarization vectors 204 and 206, viz. the coercive field times the distance 209. Coercive field value for ferroelectric materials are in the range of about 10 V/mm to 20 KV/mm FIG. 3 is block diagram outlining the method for making a periodic domain ferroelectric structure in accordance with the instant invention. In the step 301 a ferroelectric material is provided. The ferroelectric material is either a high or a low coercive Field ferroelectric, but is preferably a material that is substantially formed from $LiNbO_3$, $KTiOPO_4$ or $LiTaO_3$ and exhibits a coercive field value such that the material exhibits a spontaneous reversal of the local polarization with a change in temperature in the range of 0.1 to 40 degrees. In the step 303, conductive layers are provided on opposite surfaces that are substantially normal to the polarization vector axis. The conductive layers are formed from a conductive polymer, a metal or a salt composition material. According to the preferred embodiment of the invention, the conductive layers are formed from a mixture of polyaniline salt, n-Methyl pyrrolidone and Isopropanol, available under the name of ORMECON™ D-1000 manufactured by Ormecon Chemie GmbH & Co. KG, Ferdinand-Harten-Str. 7, D-22949, Ammersbek, Germany.

In a further embodiment of the instant invention the conductive layer includes a conductive polymer or a salt composition material in contact with the low coercive field ferroelectric material and a metal deposited on top of the conductive polymer or a salt composition material. In accordance with this embodiment, it is preferable that the metal is not in direct contact with the low coercive field ferroelectric material because some metals may react with the low coercive field ferroelectric material and modify the electrical and/or optical properties of the material.

After the conductive layers are provided in the step 303, then in the step 305 a mask is formed on one of the conductive layers. The mask is preferably provided using lithographic techniques and using lithographic materials. A portion of the conductive layer on the top surface of the ferroelectric structure is coated with a photo-resist. After the photo-resist is coated on the top conductive layer, the photo-resist and the structure is thermal cycled in accordance with the manufacturer's recommendations. The photo-resist is then exposed with a suitable light source according to a predetermined pattern and developed to form the mask. After the mask is provided in the step 305, then in the step 307 a single domain structure is formed. The single domain structure is formed by applying a sufficient bias voltage to each of the top and the bottom conductive layers to pole the polarization vectors in one direction. The voltage applied across the conductive layer on the top surface and the conductive layer on the bottom surface is equal to or greater than the coercive field times the thickness of the structure.

Once the single domain structure is created in the step 307, then a conductive material is applied to the structure in the step 308 and the structures may be stored in the step for processing at a later time. In accordance with the embodiment, prior to the step 311 of removing a portion of one of the conductive layers, in the step 312 the conductive material on the sides of the structures shorting the top and bottom conductive layer is removed to place the top and the bottom conductive layers in electrical isolation. Either after the step 307 or the step 312, in the step 309, portions of the conductive layer are removed such that the conductive layer substantially replicates the mask and leaves a conductive domain template on the top surface of the ferroelectric structure.

In the case where the initial domain structure (e.g. the starting material) is highly random with head-to-head domains in the body of the material, a single domain structure may be obtained by increasing the electrical conductivity of the material during poling through heating. Preferably, the material is heated to temperatures in a range of 100 and 200 degrees Celsius. The sign of the applied voltage then can be reversed several times during poling at these elevated temperatures in order to help eliminate the head-to-head domains.

A periodic domain structure is formed in the step 311 by applying sufficient bias voltage across the conductive template on the top surface and the conductive layer on the bottom surface of the structure that is equal to or greater than the coercive field times the thickness of the structure and biased in the opposite direction to that of the bias voltage applied in the step 309.

Figure 4A:
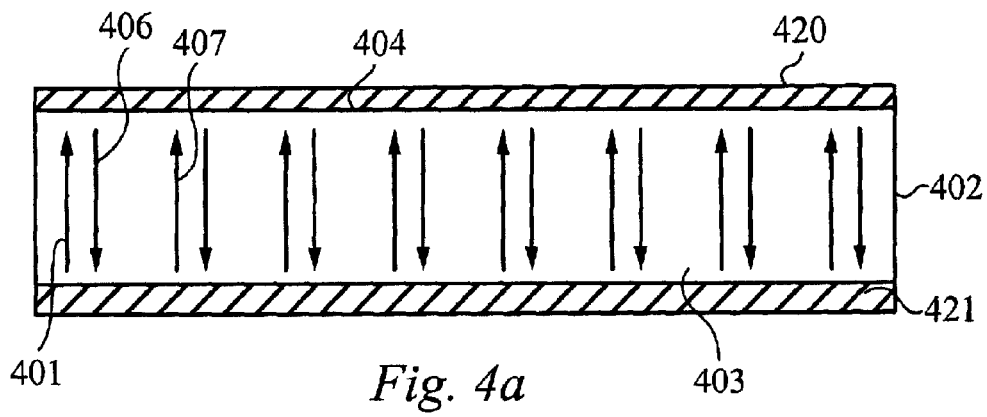
FIGS. 4a–h illustrates the steps of making a periodic domain patterned ferroelectric structure according to the preferred embodiment of the invention.

FIGS. 4a–g illustrates the steps for making a periodic ferroelectric domain structure according to the preferred embodiment of the invention. Referring to FIG. 4a, the ferroelectric structure 401 is coated with conductive layers 420 and 421 on the top surface 405 and bottom surface 403. The structure 401 is preferably a low coercive field $LiNbO_3$ and $LiTaO_3$, as described above and the top surface 405 and the bottom surface 403 and 404 correspond to surfaces which are normal to the vectors of polarization 406 and 407.

Figure 4B:
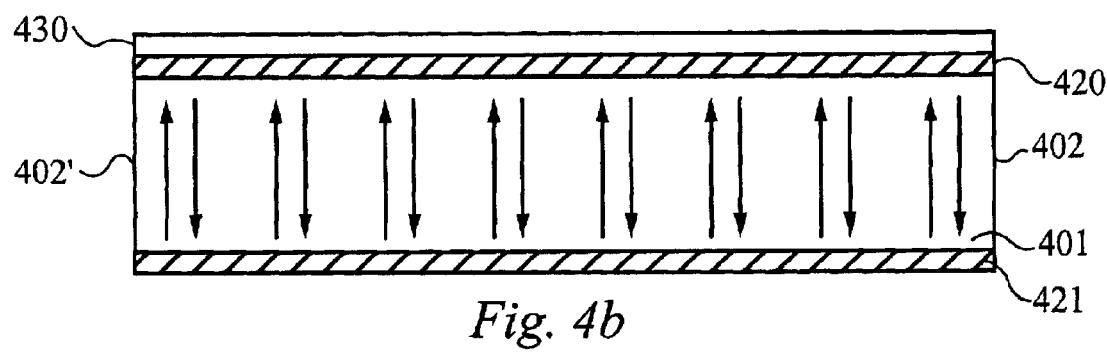

Now referring to FIG. 4b, on top of the conductive layer 420 a layer of photo-resist 430 is provided and cured. In accordance with an embodiment of the invention, the conductive layer 42 comprises a conductive polymer in contact with the surface 403 and 404 of the structure 401 with a second conductive layer formed from a metal deposited on the top of the conductive polymer. The embodiment is particularly useful when the polymer exhibits low conductivity. Thus the metal layer is provided to enhance the conductivity during domain poling but does not contact the surface 403 and 404 of the structure which leads to alterations of the electrical and optical properties of the resultant patterned structure. Also during the curing of the photo-resist layer 430, the side surface 402 and 402 may be coated with a conductive layer to place the layers 420 and 421 in electrical communication which helps reduce charging during the curing process. The conductive layer on the side surface (not shown) is removed prior to generating the single domain structure illustrated in FIG. 4d.

Figure 4C:
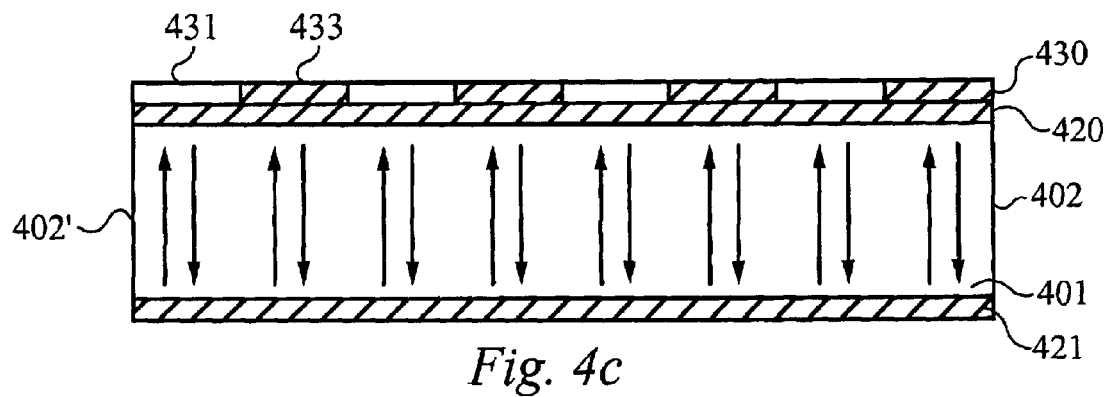

Now referring to FIG. 4c, the photo-resist layer 430 is exposed with an appropriate light source to generate exposed areas 431 and unexposed areas 438 of the photo-resist layer 430. The photo-resist layer 430 is then developed to remove the exposed areas 431 of the photo-resist layer 430 resulting in the formation of the mask 433 over the conductive layer 452, as shown in the FIG. 4d.

Figure 4D:
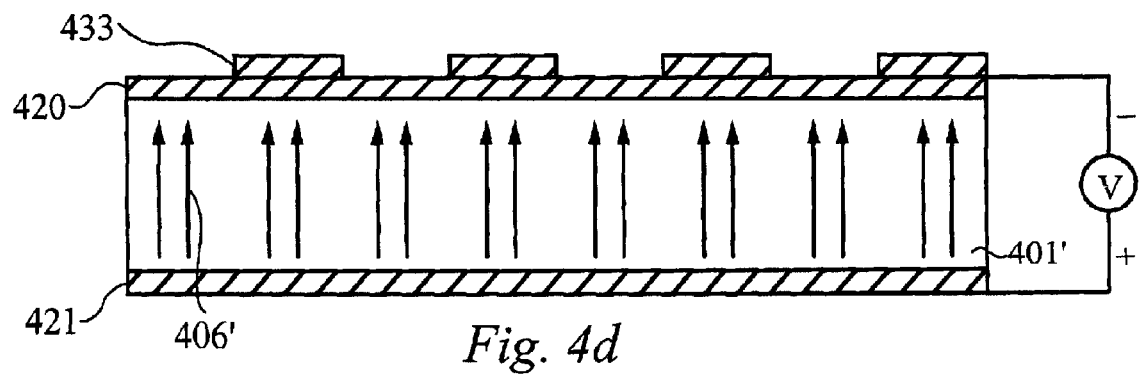

Still referring to FIG. 4d, a bias voltage is applied to the conductive layers 420 and 421 to generate a sufficient electrical field within the structure 401 such that the signs of the polarization vectors 406 switch signs 406' and align in one direction. The exposed portions of the conductive layer 420, which are not coincident with the mask 433, are then removed to form the surface 404 of the single domain 401' structure resulting in a conductive domain template 420' which is patterned similar to the mask 433 within typical processing parameters of lithographic techniques.

Figure 4E:
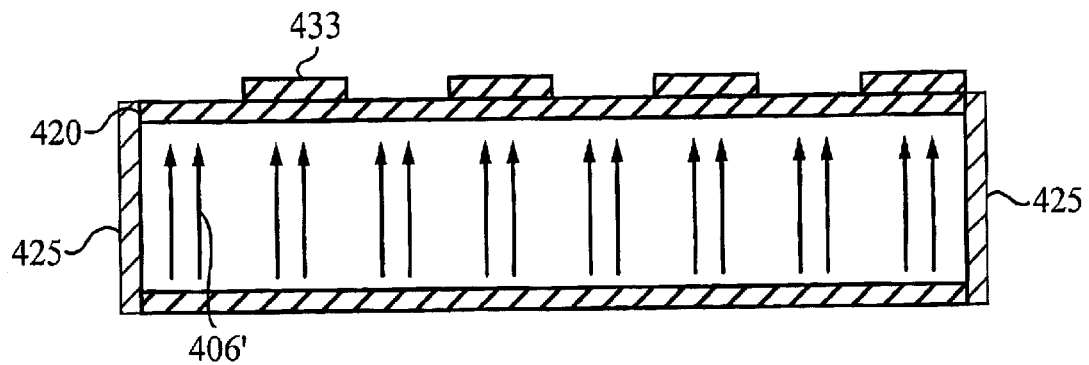
Figure 4F:
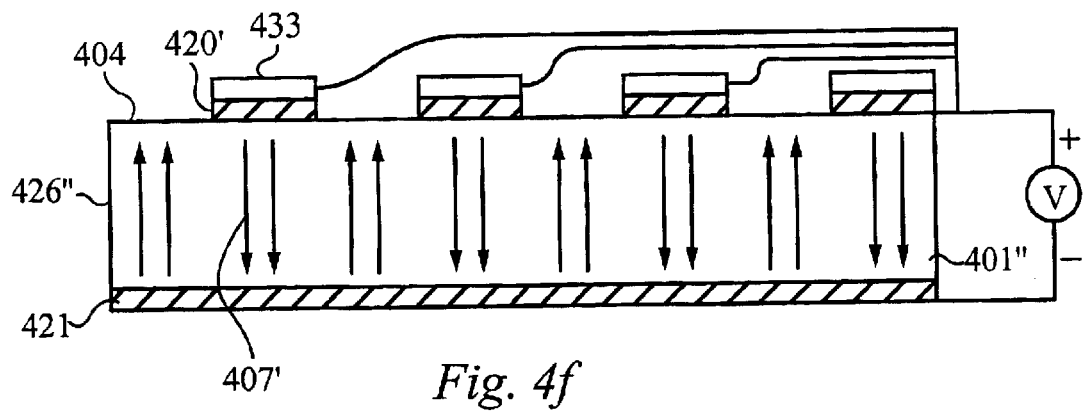

Referring to FIG. 4e, a conductive layer 425 is preferably applied to side surfaces 402 of the wafer 401, such that the conductive layers 420 and 421 are placed in electrical communication. This helps to reduce the surface charging and the formation of micro domains. The structure then may be stored for an extended period of time without significant charging.

Referring to the FIG. 4e, the conductive material is removed from the side surface 402 to place the top 420 and the bottom 420 conductive layers in electrical isolation. Portions of the layer 425 are removed. The bias voltage is then applied to the conductive domain pattern template 420' and the conductive layer 421 in order to generate a sufficient electrical field within the structure such that the polarization vectors 407 between the template 421' and the conductive layer 421 change signs 407". The structure 401" is now periodically patterned with alternating signs of polarization throughout the structure. Preferably, the structure 401" is periodically patterned with domains that are spatially modulated by a distance corresponding to a coherence length such that the structure is useful as a QPM structure in a harmonic generator apparatus. Alternatively, non-periodic domain structures can be fabricated according to the needs of the particular application.

Figure 4G:
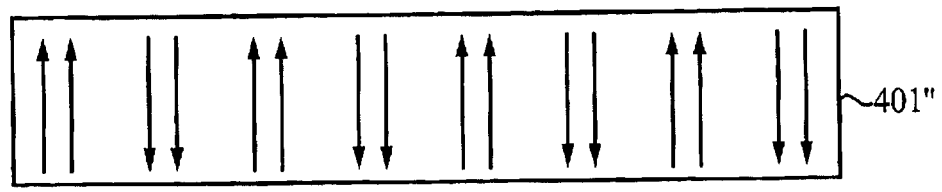
Figure 4H:
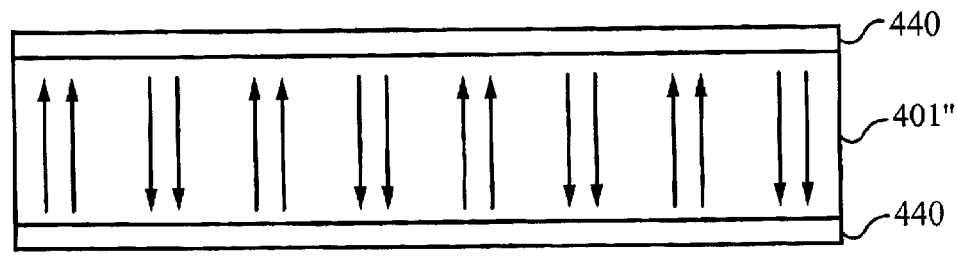

After the structure 401" is formed, then the conductive coating 421, the mask 433 and the conductive domain template 420' are removed and the domain patterned ferroelectric structure 401" is ready to be coupled with a light source in the harmonic generator apparatus. Alternatively, the structure 401" is coated with protective layers 440 as shown in FIG. 4g. Having described the preferred method of patterning a ferroelectric material, FIGS. 5–6 are used to illustrated the additional advantage of using low-coercive field ferroelectric materials in combination with the patterning method described above to make quasi-phase matching structures.

Figure 5:
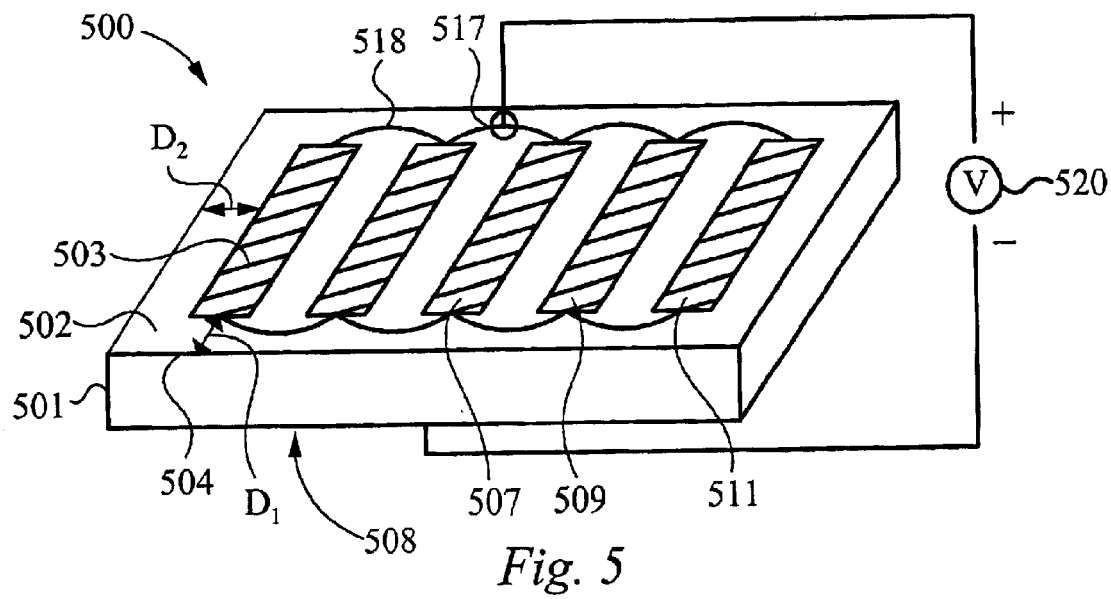
FIG. 5 shows a structure with domain patterning on a high coercive field ferroelectric

FIG. 5 shows schematic view 500 of a patterning fixture for patterning high coercive field ferroelectric material 501. Arcing can occur between a conductive layer on the top surface 502 and a conductive layer on the bottom surface 508, when electric fields as low as 3 kV/mm are applied. Thus the patterned conductive portions 503, 505, 507, 509 and 511 on the top surface 502 of the material 501 are often required to be significant distances $D_1$ and $D_2$ from the edges 504 of the material 501 to prevent arcing between conductive the portions 503, 505, 507, 509 and 511 on the top surface 502 and the conductive layer (not shown) on the bottom surface 508, when a poling voltage is applied from the voltage source 520. A second disadvantage to using high coercive field ferroelectric materials to make quasi-phase matching structures is that the conductive patterned portions 503, 505, 507, 509 and 511 often need to be placed in electrical conductivity through connections 515 provided in a separated processing step, such as applying a liquid electrolyte between the conductive patterned portions 503, 505, 507, 509 and 511. Further, because the top surface 502 of the material 501 is under utilized, for the reasons described above, suitable contact points 517 for the voltage source 520 is limited and a special fixture and procedure can be required for each different patterned structure produced.

Figure 6:
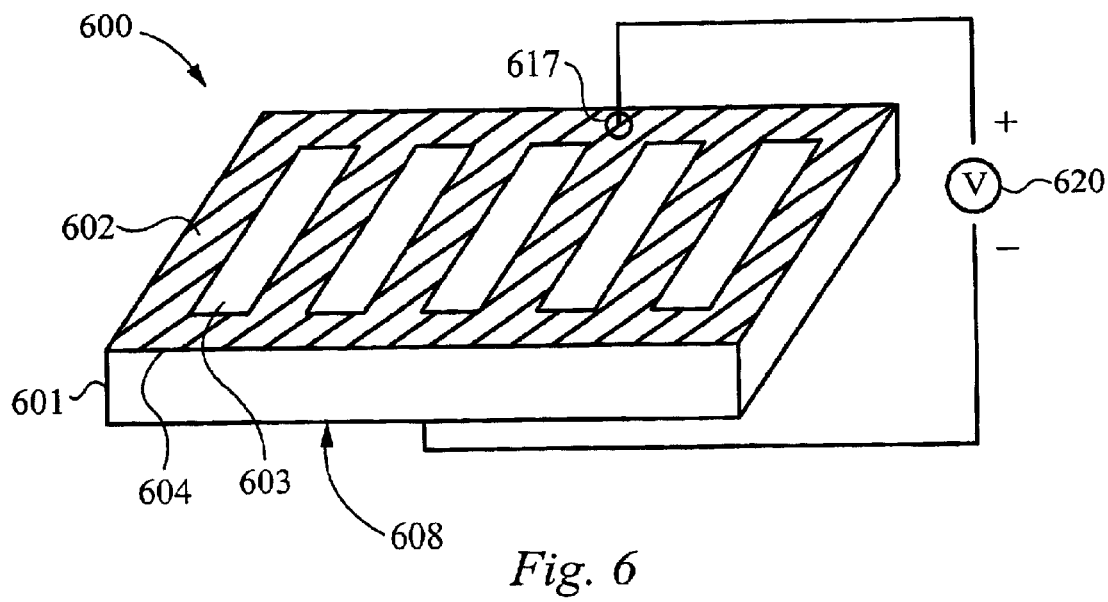
FIG. 6 shows a structure with domain patterning on a low coercive field ferroelectric.

In contrast to FIG. 5 and the procedures outlined above, FIG. 6 shows a schematic view of a patterning fixture 600 for patterning a low coercive field ferroelectric material 601. In the above example, arcing around the edge of the wafer is due to the low dielectric strength of air, which is approximately 3 kV/mm. As explained above, high coercive field ferroelectrics require special fixtures and require that $D_1$ and $D_2$ are large. Low coercive field ferroelectrics require fields that are less than 3 kV/mm to pole the domains and, therefore, can permit for the use of conductive layers 602 and 608 which go to, or near to, edges 604 and 604' of the wafer 601, while still reducing the chance of arcing when a poling voltage is applied. Also, because a greater area of the top surface 602 is utilized, the contact point 617 for the voltage source 620 can be almost anywhere that there is conductive material and a special fixture and procedure is not required for each different pattern structure produced.

The present invention has been described relative to a preferred embodiment. Improvements or modifications that become apparent to persons of ordinary skill in the art only after reading this disclosure are deemed within the spirit and scope of the application. Specifically, the present invention is for providing domain patterning of any type of ferroelectric materials including high coercive field ferroelectric materials and composite ferroelectric materials. The periodic domain patterned structures of the instant invention are useful in any number of optical, and electrical and acoustic devices including, but not limited to, waveguides and harmonic generator devices.

What is claimed is:

1. A method for generating a domain patterned ferroelectric structure comprising:
    a. depositing a conductive layer on a top surface of a ferroelectric material and a bottom surface of a ferroelectric material, the top surface and the bottom surface of the ferroelectric material corresponding to surfaces substantially normal to the z-polarization vectors of the ferroelectric material;

b. applying a sufficient bias voltage across the conductive layer on the top surface and the conductive layer on the bottom surface to pole the z-polarization vectors into a first orientation; and c. applying a sufficient bias voltage to selected portions of the conductive layer on the top surface on the ferroelectric material and the conductive layer on the bottom surface of the ferroelectric material to orient corresponding portions of the z-polarization vectors to a second orientation.

2. The method of claim 1, wherein the conductive layer comprises a conductive polymer in contact with the top surface and the bottom surface of the ferroelectric material.

3. The method of claim 2, wherein the conductive polymer comprises is n-Methyl pyrrolidone.

4. The method of claim 2, wherein the conductive layer further comprises a salt.

5. The method of claim 4, wherein the salt is a polyaniline salt.

6. The method of claim 2, wherein the conductive layer further comprises a metal deposited onto the conductive polymer.

7. The method of claim 1, wherein the selected portions of the conductive layer on the top surface of the ferroelectric material are selected by patterning the conductive layer on the top surface of the ferroelectric material.

8. The method of claim 7, wherein the conductive layer on the top surface of the ferroelectric material is patterned by:

a. forming a mask over the conductive layer on the top surface of the ferroelectric material;

b. selectively removing the exposed portion of the conductive layer on the top surface of the ferroelectric material; and c. removing the mask.

9. The method of claim 8, wherein the mask is formed from a photo-resist.

10. The method of claim 9, wherein the mask is formed by:

a. depositing the photo-resist on the conductive layer on the top surface of the ferroelectric material;

b. exposing areas of the photo-resist with a light source according to a predetermined pattern; and c. developing the photo-resist to remove the unexposed portions of the photo-resist.

11. The method of claim 1, further comprising the steps of placing the conductive layer on the top surface of the ferroelectric material and the conductive layer on the bottom surface of the ferroelectric material in electrical communication.

12. The method of claim 11, wherein the step of placing the conductive layer on the top surface of the ferroelectric material and the conductive layer on the bottom surface of the ferroelectric material in electrical communication is performed after applying the sufficient bias voltage across the conductive layer on the top surface and the conductive layer on the bottom surface to pole the z-polarization vectors into the first orientation.

13. The method of claim 11, wherein the conductive layer on the top surface of the ferroelectric material and the conductive layer on the bottom surface of the ferroelectric material are placed in electrical communication by applying a conductive polymer to side surfaces of the ferroelectric material.

14. The method of claim 13, further comprising:

a. removing the conductive polymer from the side surfaces of the ferroelectric material prior to applying the sufficient bias voltage to selected portions of the conductive layer on the top surface and the conductive layer on the bottom surface of the ferroelectric material; and b. reapplying the conductive polymer to the side surfaces of the ferroelectric material after applying the sufficient bias voltage to the selected portions of the conductive layer on the top surface of the ferroelectric material and the conductive layer on the bottom surface of the ferroelectric material.

15. The method of claim 1, wherein the ferroelectric material is a wafer structure comprising Lithium.

16. The method of claim 15, wherein the wafer further comprises an element selected from the group consisting of Tantalum and Niobium.

17. The method of claim 1, wherein the ferroelectric structure is a wafer that is formed from a material selected from the group consisting of $LiNbO_3$ or $LiTaO_3$.

18. The method of claim 17, wherein the wafer is annealed in the presence of a corresponding Li-rich $LiNbO_3$ or a $LiTaO_3$ powder, thereby producing a low coercive field ferroelectric wafer structure.

19. The method of claim 1, wherein the ferroelectric material exhibits spontaneous domain reversal with changes in temperature of less than 40 degrees Celsius, wherein $\Delta T = q^{-1} \cdot \xi \cdot E_c$, and wherein q is the pyroelectric coefficient, $\xi$ is the permitivity of the ferroelectric and $E_c$ is the coercive field.

20. The method of claim 1, wherein the ferroelectric material exhibits spontaneous polarization with changes in temperature of less than 10 degrees Celsius, wherein $\Delta T = q^{-1} \cdot \xi \cdot E_c$ and wherein q is the pyroelectric coefficient, $\xi$ is the permitivity of the ferroelectric and $E_c$ is the coercive field.

21. The method of claim 1, wherein the ferroelectric material exhibits a coercive field value $E_c$ of 3 kV/mm or less.

22. The method of claim 1, wherein the ferroelectric material is a wafer with an edge surface and, wherein the conductive layer on the top surface of the wafer and the bottom surface of the wafer are deposited a distance within 2.0 mm or less from the edge surface.

* * * * *